United States Patent
Yan et al.

(10) Patent No.: US 12,532,162 B2
(45) Date of Patent: Jan. 20, 2026

(54) METHOD AND COMMUNICATION SYSTEM FOR OBTAINING RIGHT OF DEVICE CONTROL BASED ON ENCRYPTION

(71) Applicant: HUAWEI TECHNOLOGIES CO., LTD., Guangdong (CN)

(72) Inventors: Guoqi Yan, Xi'an (CN); Rui Shi, Shenzhen (CN); Bin Wang, Xi'an (CN); Xin Zhao, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 196 days.

(21) Appl. No.: 18/255,059

(22) PCT Filed: Nov. 30, 2021

(86) PCT No.: PCT/CN2021/134426
§ 371 (c)(1),
(2) Date: May 30, 2023

(87) PCT Pub. No.: WO2022/111728
PCT Pub. Date: Jun. 2, 2022

(65) Prior Publication Data
US 2024/0007851 A1  Jan. 4, 2024

(30) Foreign Application Priority Data
Nov. 30, 2020 (CN) .......................... 202011375333.4

(51) Int. Cl.
*H04W 12/037* (2021.01)
*H04L 9/08* (2006.01)
(Continued)

(52) U.S. Cl.
CPC .......... *H04W 12/037* (2021.01); *H04L 9/088* (2013.01); *H04L 9/14* (2013.01); *H04L 12/282* (2013.01);
(Continued)

(58) Field of Classification Search
None
See application file for complete search history.

(56) References Cited

U.S. PATENT DOCUMENTS

| 2014/0277837 A1* | 9/2014 | Hatton | H04L 63/0853 701/2 |
| 2016/0044001 A1* | 2/2016 | Pogorelik | G06F 21/44 713/168 |

(Continued)

FOREIGN PATENT DOCUMENTS

| CN | 103747102 A | 4/2014 |
| CN | 104243250 A | 12/2014 |

(Continued)

OTHER PUBLICATIONS

Extended European Search Report in European Appln No. 21897228.9, dated Mar. 13, 2024, 9 pages.

(Continued)

*Primary Examiner* — William J. Goodchild
(74) *Attorney, Agent, or Firm* — Fish & Richardson P.C.

(57) ABSTRACT

This disclosure provides methods and apparatuses relating to obtaining device control right. One method is applied to a system including a first device and a second device. The first device detects that the second device approaches the first device, the first device sends a first key to the second device. After receiving the first key, the second device encrypts a control instruction by using the first key, where the control instruction is used to control the first device. The second device sends the encrypted control instruction to the first (Continued)

device, and the first device decrypts the encrypted control instruction to obtain the control instruction and executes the control instruction.

20 Claims, 18 Drawing Sheets

(51) Int. Cl.
*H04L 9/14* (2006.01)
*H04L 12/28* (2006.01)
(52) U.S. Cl.
CPC .............. *H04L 2012/2841* (2013.01); *H04L 2012/2849* (2013.01)

(56) References Cited

U.S. PATENT DOCUMENTS

| | | | | |
|---|---|---|---|---|
| 2017/0236343 | A1* | 8/2017 | Leboeuf | G07C 9/20 340/5.61 |
| 2019/0132731 | A1* | 5/2019 | Covain | H04W 12/0431 |

FOREIGN PATENT DOCUMENTS

| | | |
|---|---|---|
| CN | 105141584 A | 12/2015 |
| CN | 106941703 A | 7/2017 |
| CN | 108173720 A | 6/2018 |
| CN | 108337253 A | 7/2018 |
| CN | 108540357 A | 9/2018 |
| CN | 109068307 A | 12/2018 |
| CN | 110352606 A | 10/2019 |
| CN | 110636445 A | 12/2019 |
| CN | 110703621 A | 1/2020 |
| CN | 110941501 A | 3/2020 |
| CN | 111049711 A | 4/2020 |
| WO | 2020055045 A1 | 3/2020 |
| WO | 2020155014 A1 | 8/2020 |

OTHER PUBLICATIONS

International Search Report and Written Opinion in International Appln. No. PCT/CN2021/134426, mailed on Mar. 2, 2022, 15 pages (with English translation).

* cited by examiner

METHOD AND COMMUNICATION SYSTEM FOR OBTAINING RIGHT OF DEVICE CONTROL BASED ON ENCRYPTION

CROSS-REFERENCE TO RELATED APPLICATIONS

This application is a national stage of International Application No. PCT/CN2021/134426, filed on Nov. 30, 2021, which claims priority to Chinese Patent Application No. 202011375333.4, filed on Nov. 30, 2020. Both of the aforementioned applications are incorporated herein by reference in their entireties.

TECHNICAL FIELD

This application relates to the field of terminal technologies, and in particular, to a device control right obtaining method and a communication system.

BACKGROUND

With development of Internet of Things (Internet of things, IoT) technologies in recent years, various types of IoT devices, for example, various home appliances, have entered thousands of households. To facilitate a user to operate a device, a mobile terminal (for example, a mobile phone) of the user may control the device. However, a plurality of users may use a same device. For example, there are a plurality of family members, and all the plurality of family members need to use a home appliance. In this case, how to manage a control right of the device is a problem worth considering.

SUMMARY

This application aims to provide a device control right obtaining method and a communication system, to facilitate convenient obtaining of a device control right.

According to a first aspect, a device control right obtaining method is provided, where the method may be applied to a system including a first device and a second device, and the method includes: The first device detects that the second device approaches the first device. The first device sends a first key to the second device. After receiving the first key, the second device encrypts a control instruction by using the first key, where the control instruction is used to control the first device. The second device sends the encrypted control instruction to the first device. The first device decrypts the encrypted control instruction to obtain the control instruction, and executes the control instruction.

In other words, when the second device approaches the first device, the second device may obtain the first key of the first device, and then obtain a control right over the first device based on the first key. In this manner, it is convenient to obtain the device control right. For example, the first device is a home device, and the second device is a mobile terminal (for example, a mobile phone). When a user wants to control the home device, the user only needs to move the mobile phone close to the home device to obtain a control right over the home device. This is easy to operate, and user experience is good.

In a possible design, the method further includes: The second device displays first prompt information, where the first prompt information is used to prompt whether to apply for a temporary control right over the first device; when receiving a confirmation instruction, the second device sends a first application to the first device, where the first application indicates that the second device applies for the temporary control right over the first device. That the first device sends a first key to the second device includes: When receiving the first application from the second device, the first device sends the first key to the second device.

It may be understood that, when detecting that the second device approaches the first device, the first device may automatically send the first key to the first device. Definitely, for the sake of security, when the first device detects that the second device approaches, the first device does not send the first key to the second device temporarily, and sends the first key to the second device after receiving the first application from the second device. In this way, a key may be prevented from being sent by mistake, for example, a user may be prevented from obtaining the temporary control right of the first device because the user unconsciously carries the second device to approach the first device. This protects the first device better.

In a possible design, the first key has a validity period, and when the validity period expires, the first key is invalid, where the validity period is preset, or is set by a user, or is determined based on a type of the first device, and validity periods of first keys generated by different types of first devices are different. In this way, a case in which the key takes effect for a long time can be avoided, and security is improved. If the key takes effect for a long time, there is a high probability that the key is stolen, and security is low.

In a possible design, the method further includes: When a preset condition is satisfied, the temporary control right of the second device over the first device terminates, where the preset condition includes at least one of the following conditions:
 use duration of the first key exceeds the validity period; or
 duration starting from a moment at which the second device receives the first key reaches preset duration; or
 the first device detects that a third device approaches the first device; or
 an operation for terminating the temporary control right of the second device over the first device is detected on the first device; or
 the first device receives an instruction from an owner of the first device, where the owner is a device that can control the first device by using a cloud, and the instruction instructs to terminate the temporary control right of the second device over the first device; or
 the first device detects that a distance between the second device and the first device is greater than a second preset distance.

In other words, when the second device approaches the first device, the obtained control right over the first device is not always effective, and the control right is terminated when the foregoing preset condition is met. In this way, security of the first device can be improved, and the second device is prevented from holding the control right over the first device for a long time.

In a possible design, the system further includes a fourth device, the fourth device is the owner of the first device, and the owner is a device that can control the first device by using the cloud; and before that the first device sends a first key to the second device, the method further includes:

The first device sends a confirmation request to the fourth device, where the confirmation request is used to confirm whether the second device is allowed to obtain the temporary control right over the first device.

That the first device sends a first key to the second device includes:

The first device sends the first key to the second device when receiving a consent instruction from the fourth device.

In other words, when detecting that the second device approaches, the first device may request confirmation of the owner of the first device, and when receiving the consent instruction of the owner, the first device sends the first key to the second device. In this manner of sending the key to the second device only after the owner agrees, the first device can be better protected, and security is higher.

In a possible design, that the first device sends a confirmation request to the fourth device includes:

The first device sends a second application to the cloud, where the second application indicates that the second device applies for the temporary control right over the first device.

In response to the received second application, the cloud determines, based on a mapping relationship between a device and an owner, that the owner of the first device is the fourth device.

The cloud sends the confirmation request to the fourth device.

In other words, the cloud side records the owner of the device, and that the first device requests the owner of the first device for confirmation may be implemented by the cloud. This manner of sending the key to the second device only after the owner agrees is more secure.

In a possible design, the method further includes: The first device generates authentication-free duration and/or a quantity of authentication-free times. After the temporary control right of the second device over the first device terminates, when the first device detects that the second device approaches the first device again, and determines that the authentication-free duration is not exceeded, and/or an accumulated quantity of approaching times of the second device does not exceed the quantity of authentication-free times, the first device skips confirmation with the fourth device.

In other words, after the second device obtains the temporary control right over the first device, the first device may generate the authentication-free duration and/or the quantity of authentication-free times, so as to avoid frequently requesting the owner of the first device for confirmation.

In a possible design, that the first device sends the first key to the second device when receiving a consent instruction from the fourth device includes: After the first device receives the consent instruction from the fourth device, and when the first device detects that the second device approaches the first device again, the first device sends the first key to the second device.

In other words, when detecting that the second device approaches, the first device requests the owner for confirmation. After the owner agrees, if the first device detects that the second device approaches again, the first device sends the key to the second device. In this way, the key can be prevented from being sent by mistake, and security is improved.

In a possible design, the method further includes: The second device determines a function that is in the first device and that supports the temporary control right, where the control instruction sent by the second device to the first device is used to control the function that is in the first device and that supports the temporary control right, where the function is a preset function in the first device, or a function specified by the user, or a function that is in the first device and that is unrelated to user privacy.

In other words, the second device obtains the temporary control right over the first device, but can control a limited function of the first device. The second device can control a function of supporting the temporary control right in the first device, but cannot control other functions. In this manner, a related function (for example, a function related to user privacy) of the first device can be protected from being arbitrarily controlled, thereby better protecting the first device.

In a possible design, the method further includes: The second device displays second prompt information, where the second prompt information is used to prompt whether to apply for a permanent control right over the first device.

When receiving a confirmation instruction, the second device sends a third application to the first device, where the third application indicates that the second device applies for the permanent control right over the first device.

The first device sends the third application to the cloud.

The cloud records, in response to the received third application, that the second device is the owner of the first device, so that the second device can control the first device by using the cloud.

In other words, the second device may further apply to become the owner of the first device. When the cloud records that the owner of the first device is the second device, the second device may control the first device by using the cloud.

In a possible design, that the cloud records, in response to the received third application, that the second device is the owner of the first device, so that the second device can control the first device by using the cloud includes:

In response to the third application, the cloud determines that the owner of the first device is the fourth device.

The cloud sends a confirmation request to the fourth device, where the confirmation request indicates whether the second device is allowed to obtain the permanent control right over the first device.

When receiving a consent instruction, the cloud records that the owner of the first device is updated from the fourth device to the second device.

In other words, if the owner of the first device is the fourth device, when the second device applies to become the owner of the first device, the cloud may request confirmation of the fourth device. If the consent instruction of the fourth device is received, the owner of the first device is updated to the second device, so that the second device can control the first device by using the cloud. This manner of requesting confirmation from the original owner is more secure.

In a possible design, the system further includes the fourth device, the fourth device is the owner of the first device, and the owner is the device that can control the first device by using the cloud; and the method further includes:

The fourth device receives a first operation, where the first operation indicates to enable a short-range communication function or an ultra-short-range communication function of the first device.

In response to the first operation, the fourth device sends, to the first device, an instruction that instructs the first device to enable the short-range communication function or the ultra-short-range communication function.

In response to the received instruction, the first device enables the short-range communication function or the ultra-short-range communication function.

In other words, the owner of the first device may control enabling or disabling of the short range communication function or the ultra-short range communication function of the first device. When the short range communication function or the ultra-short distance communication function of the first device is enabled, if the second device also enables a short range communication function or an ultra-short distance communication function, the second device may obtain the temporary control right over the first device when approaching the first device. This manner of controlling by an owner is more secure.

In a possible design, that the first device sends a first key to the second device includes:

The first device sends the first key to the second device through NFC or Wi-Fi Aware.

It should be noted that NFC or Wi-Fi Aware herein is only an example, and another short-range communication technology or another ultra-short-distance communication technology may also be used. This is not limited in embodiments of this application.

In a possible design, that the first device detects that the second device approaches the first device includes:

The first device detects that a distance between the second device and the first device is less than a first threshold; and/or the first device detects that signal strength of the second device is greater than a second threshold.

In other words, the first device may determine, based on the distance or the signal strength, whether the second device approaches the first device. This short-distance information interaction manner has higher security.

In a possible design, the first threshold is a value in a range of 0 cm to 30 cm, and the second threshold is a value in a range of −5 dbm to −150 dbm.

It should be noted that the foregoing values are only examples of the first threshold and the second threshold, and specific values of the first threshold and the second threshold are not limited in embodiments of this application.

In a possible design. the first device is a home device, the second device is a mobile terminal, and the control instruction is used to control the home device to be turned on or turned off, or to adjust a running parameter, where the home device includes one or more of a television, a sound box, a game console, a lighting device, a cleaning device, or a cooking device. For example, the mobile terminal is a mobile phone, and the home device is a sound box. The control instruction may be turning on or turning off, playing a song XXX, switching to a next song, and the like.

In a possible design, the first device is an office device, the second device is a mobile terminal, and the control instruction is used to control the office device to be turned on or turned off, or to adjust a running parameter, where the office device includes one or more of a projector. a printer. a copier, or a PC. For example, the mobile terminal is a mobile phone, and the office device is a printer. The control instruction may be turning on or turning off the printer, start printing, stop printing, suspend printing, or the like.

According to a second aspect, a device control right obtaining method is provided, where the method is applied to a first device, and the method includes:

The first device detects that a second device approaches the first device.

The first device sends a first key to the second device.

The first device receives an encrypted control instruction from the second device.

The first device decrypts the encrypted control instruction to obtain the control instruction, and executes the control instruction.

In a possible design, that the first device sends a first key to the second device includes:

When receiving a first application from the second device, the first device sends the first key to the second device.

In a possible design, the first key has a validity period, and when the validity period expires, the first key is invalid, where the validity period is preset, or is set by a user, or is determined based on a type of the first device, and validity periods of first keys generated by different types of first devices are different.

In a possible design, the method further includes: when a preset condition is satisfied, terminating the temporary control right of the second device over the first device, where the preset condition includes at least one of the following conditions.

use duration of the first key exceeds the validity period; or duration starting from a moment at which the second device receives the first key reaches preset duration; or the first device detects that a third device approaches the first device; or an operation for terminating the temporary control right of the second device over the first device is detected on the first device; or the first device receives an instruction from an owner of the first device, where the owner is a device that can control the first device by using a cloud, and the instruction instructs to terminate the temporary control right of the second device over the first device; or the first device detects that a distance between the second device and the first device is greater than a second preset distance.

In a possible design, before that the first device sends a first key to the second device, the method further includes:

The first device sends a confirmation request to a fourth device, where the confirmation request is used to confirm whether the second device is allowed to obtain the temporary control right over the first device. The fourth device is the owner of the first device, and the owner is a device that can control the first device by using the cloud.

That the first device sends a first key to the second device includes:

The first device sends the first key to the second device when receiving a consent instruction from the fourth device.

In a possible design, that the first device sends a confirmation request to the fourth device includes:

The first device sends a second application to the cloud, where the second application indicates that the second device applies for the temporary control right over the first device, so that the cloud determines, based on a mapping relationship between a device and an owner in response to the received second application, that the owner of the first device is the fourth device, and sends a confirmation request to the fourth device.

In a possible design, the method further includes: The first device generates authentication-free duration and/or a quantity of authentication-free times. After the temporary control right of the second device over the first device terminates, when the first device detects that the second device approaches the first device again, and determines that the authentication-free duration is not exceeded, and/or an accumulated quantity of approaching times of the second device does not exceed the quantity of authentication-free times, the first device skips confirmation with the fourth device.

In a possible design, that the first device sends the first key to the second device when receiving a consent instruction from the fourth device includes:

After the first device receives the consent instruction from the fourth device, and when the first device detects that the second device approaches the first device again, the first device sends the first key to the second device.

In a possible design, the method further includes: The first device determines a function that is in the first device and that supports the temporary control right. When the control instruction sent by the second device to the first device is used to control the function that is in the first device and that supports the temporary control right, the first device executes the control instruction, where
    the function is a preset function in the first device, or a function specified by the user, or a function that is in the first device and that is unrelated to user privacy.

In a possible design, the method further includes:

The first device receives a third application from the second device, where the third application indicates that the second device applies for a permanent control right over the first device.

The first device sends the third application to the cloud, so that the cloud records, in response to the received third application, that the second device is the owner of the first device, so that the second device can control the first device by using the cloud.

In a possible design, the method further includes:

The first device receives an instruction from the fourth device, where the instruction instructs the first device to enable a short range communication function or an ultra-short range communication function, the fourth device is the owner of the first device, and the owner is the device that can control the first device by using the cloud.

In response to the received instruction, the first device enables the short-range communication function or the ultra-short-range communication function.

In a possible design, that the first device sends a first key to the second device includes:

The first device sends the first key to the second device through NFC or Wi-Fi Aware.

In a possible design, that the first device detects that the second device approaches the first device includes:

The first device detects that a distance between the second device and the first device is less than a first threshold; and/or
    the first device detects that signal strength of the second device is greater than a second threshold.

In a possible design, the first threshold is a value in a range of 0 cm to 30 cm, and the second threshold is a value in a range of −5 dbm to −150 dbm.

In a possible design, the first device is a home device, the second device is a mobile terminal, and the control instruction is used to control the home device to be turned on or turned off, or to adjust a running parameter, where the home device includes one or more of a television, a sound box, a game console, a lighting device, a cleaning device, or a cooking device; or
    the first device is an office device, the second device is a mobile terminal, and the control instruction is used to control the office device to be turned on or turned off, or to adjust a running parameter, where the office device includes one or more of a projector, a printer, a copier, or a PC.

According to a third aspect, a device control right obtaining method is provided, where the method is applied to a second device, and the method includes:

The second device detects that the second device approaches a first device.

The second device receives a first key from the first device.

The second device encrypts a control instruction by using the first key, where the control instruction is used to control the first device.

The second device sends the encrypted control instruction to the first device.

In a possible design, before that the second device receives a first key from the first device, the method further includes:

The second device displays first prompt information, where the first prompt information is used to prompt whether to apply for a temporary control right over the first device.

When receiving a confirmation instruction, the second device sends a first application to the first device, where the first application indicates that the second device applies for the temporary control right over the first device.

In a possible design, the first key has a validity period, and when the validity period expires, the first key is invalid, where the validity period is preset, or is set by a user, or is determined based on a type of the first device, and validity periods of first keys generated by different types of first devices are different.

In a possible design, the method further includes: When a preset condition is satisfied, the temporary control right of the second device over the first device terminates, where the preset condition includes at least one of the following conditions.
    use duration of the first key exceeds the validity period; or
    duration starting from a moment at which the second device receives the first key reaches preset duration; or
    an operation for terminating the temporary control right of the second device over the first device is detected on the second device; or
    the second device detects that a distance between the second device and the first device is greater than a second preset distance.

In a possible design, the method further includes:

The second device determines a function that is in the first device and that supports the temporary control right, where the control instruction sent by the second device to the first device is used to control the function that is in the first device and that supports the temporary control right, where
    the function is a preset function in the first device, or a function specified by the user, or a function that is in the first device and that is unrelated to user privacy.

In a possible design, the method further includes:

The second device displays second prompt information, where the second prompt information is used to prompt whether to apply for a permanent control right over the first device.

When receiving a confirmation instruction, the second device sends a third application to the first device, where the third application indicates that the second device applies for the permanent control right over the first device, so that the first device applies to the cloud for the second device as an owner of the first device.

In a possible design, that the second device receives a first key from the first device includes:
    receiving the first key from the first device through NFC or Wi-Fi Aware.

In a possible design, that the second device detects that the second device approaches the first device includes:
    detecting that a distance between the second device and the first device is less than a first threshold; and/or
    detecting that signal strength of the second device is greater than a second threshold.

In a possible design, the first threshold is a value in a range of 0 cm to 30 cm, and the second threshold is a value in a range of −5 dbm to −150 dbm.

In a possible design, the first device is a home device, the second device is a mobile terminal, and the control instruction is used to control the home device to be turned on or turned off, or to adjust a running parameter, where the home device includes one or more of a television, a sound box, a game console, a lighting device, a cleaning device, or a cooking device; or the first device is an office device, the second device is a mobile terminal, and the control instruction is used to control the office device to be turned on or turned off, or to adjust a running parameter, where the office device includes one or more of a projector, a printer, a copier, or a PC.

According to a fourth aspect, a device control right obtaining method is provided, where the method is applied to a fourth device, and the method includes:

The fourth device applies to a cloud for becoming an owner of a first device, where the owner is a device that can control the first device by using the cloud.

The fourth device receives a confirmation request from the first device, where the confirmation request is used to confirm whether the second device is allowed to obtain a control right over the first device.

When detecting a confirmation operation, the fourth device sends a consent instruction to the first device, where the consent instruction indicates that the second device is allowed to obtain the control right over the first device.

In a possible design, the method further includes: The fourth device receives a first operation, where the first operation indicates to enable a short-range communication function or an ultra-short-range communication function of the first device.

In response to the first operation, the fourth device sends, to the first device, an instruction that instructs the first device to enable the short-range communication function or the ultra-short-range communication function.

In response to the received instruction, the first device enables the short-range communication function or the ultra-short-range communication function.

In a possible design, the fourth device may be a mobile terminal, for example, a mobile phone, a tablet computer, a band, or a watch, and the first device may be a home device, an office device, or the like.

According to a fifth aspect, a device control right obtaining method is further provided, where the method is applied to a cloud, and the method includes:

The cloud receives an application from a first device, where the application indicates that a second device applies for a control right over the first device.

The cloud determines, based on a mapping relationship between a device and an owner, that an owner of the first device is a fourth device, where the owner is a device that can control the first device by using the cloud.

The cloud sends a confirmation request to the fourth device, where the confirmation request indicates whether the second device is allowed to obtain the control right over the first device.

When receiving a consent instruction from the fourth device, the cloud sends a consent instruction to the first device, where the consent instruction indicates that the second device is allowed to obtain the control right over the first device.

In a possible design, when the application indicates that the second device applies for being referred to as the owner of the first device, the method further includes:

The cloud records that the owner of the first device is updated from the fourth device to the second device.

According to a sixth aspect, a communication system is further provided, including: a first device and a second device, where
    the first device includes one or more processors, a memory, and one or more programs, where the one or more programs are stored in the memory, the one or more programs include instructions, and when the instructions are executed by the first device, the first device performs the following steps:
    detecting that the second device approaches the first device; and
    sending a first key to the second device;
    the second device includes one or more processors, a memory, and one or more programs, where the one or more programs are stored in the memory, the one or more programs include instructions, and when the instructions are executed by the second device, the second device performs the following steps:
    after receiving the first key, encrypting a control instruction by using the first key, where the control instruction is used to control the first device; and
    sending the encrypted control instruction to the first device; and
    when the instructions are executed by the first device, the first device further performs the following step: decrypting the encrypted control instruction to obtain the control instruction and executing the control instruction.

In a possible design, when the instructions are executed by the second device, the second device further performs the following steps:
    displaying first prompt information, where the first prompt information is used to prompt whether to apply for a temporary control right over the first device;
    when receiving a confirmation instruction, sending a first application to the first device, where the first application indicates that the second device applies for the temporary control right over the first device; and
    when the instructions are executed by the first device, the first device specifically performs the following step:
    when receiving the first application from the second device, sending the first key to the second device.

In a possible design, the first key has a validity period, and when the validity period expires, the first key is invalid, where the validity period is preset, or is set by a user, or is determined based on a type of the first device, and validity periods of first keys generated by different types of first devices are different.

In a possible design, when the instructions are executed by the first device, the first device further performs the following step: when a preset condition is satisfied, terminating the temporary control right of the second device over the first device, where the preset condition includes at least one of the following conditions.
    use duration of the first key exceeds the validity period; or
    duration starting from a moment at which the second device receives the first key reaches preset duration; or
    the first device detects that a third device approaches the first device; or an operation for terminating the temporary control right of the second device over the first device is detected on the first device; or the first device receives an instruction from an owner of the first device, where the owner is a device that can control the first device by using a cloud, and the instruction instructs to terminate the temporary control right of the second device over the first device; or the first device detects that a distance between the second device and the first device is greater than a second preset distance.

In a possible design, the system further includes a fourth device and the cloud, the fourth device is the owner of the first device, and the owner is a device that can control the first device by using the cloud; and when the instructions are executed by the first device, the first device specifically performs the following steps: sending a confirmation request to the fourth device, where the confirmation request is used to confirm whether the second device is allowed to obtain the temporary control right over the first device; and when receiving a consent instruction from the fourth device, sending the first key to the second device.

In a possible design, when the instructions are executed by the first device, the first device specifically performs the following step: sending a second application to the cloud, where the second application indicates that the second device applies for the temporary control right over the first device.

The cloud includes one or more processors, a memory, and one or more programs. where the one or more programs are stored in the memory, the one or more programs include instructions, and when the instructions are executed by the cloud, the cloud performs the following steps:

In response to the received second application, the cloud determines, based on a mapping relationship between a device and an owner, that the owner of the first device is the fourth device; and sends the confirmation request to the fourth device.

In a possible design, when the instructions are executed by the first device, the first device further performs the following steps: generating authentication-free duration and/or a quantity of authentication-free times; and after the temporary control right of the second device over the first device terminates, when the first device detects that the second device approaches the first device again, and determines that the authentication-free duration is not exceeded, and/or an accumulated quantity of approaching times of the second device does not exceed the quantity of authentication-free times, skipping confirmation with the fourth device.

In a possible design, when the instructions are executed by the first device, the first device specifically performs the following step: after the first device receives the consent instruction from the fourth device, and when the first device detects that the second device approaches the first device again, sending the first key to the second device.

In a possible design, when the instructions are executed by the second device, the second device further performs the following step:

determining a function that is in the first device and that supports the temporary control right, where the control instruction sent by the second device to the first device is used to control the function that is in the first device and that supports the temporary control right, where the function is a preset function in the first device, or a function specified by the user, or a function that is in the first device and that is unrelated to user privacy.

In a possible design, the system further includes the cloud.

When the instructions are executed by the second device, the second device further performs the following steps:

The second device displays second prompt information, where the second prompt information is used to prompt whether to apply for a permanent control right over the first device.

When receiving a confirmation instruction, the second device sends a third application to the first device, where the third application indicates that the second device applies for the permanent control right over the first device.

When the instructions are executed by the first device, the first device further performs the following step: The first device sends the third application to the cloud.

The cloud includes one or more processors, a memory, and one or more programs, where the one or more programs are stored in the memory, the one or more programs include instructions, and when the instructions are executed by the cloud, the cloud performs the following step:

in response to the received third application, recording that the second device is the owner of the first device, so that the second device can control the first device by using the cloud.

In a possible design, when the instructions are executed by the cloud, the cloud specifically performs the following steps:

In response to the third application, the cloud determines that the owner of the first device is the fourth device.

The cloud sends a confirmation request to the fourth device, where the confirmation request indicates whether the second device is allowed to obtain the permanent control right over the first device.

When receiving a consent instruction, the cloud records that the owner of the first device is updated from the fourth device to the second device.

In a possible design, the system further includes the fourth device, the fourth device is the owner of the first device, and the owner is a device that can control the first device by using the cloud.

The fourth device includes one or more processors, a memory, and one or more programs, where the one or more programs are stored in the memory, the one or more programs include instructions, and when the instructions are executed by the fourth device, the fourth device performs the following steps:

The fourth device receives a first operation, where the first operation indicates to enable a short-range communication function or a short-range communication function of the first device.

In response to the first operation, the fourth device sends, to the first device, an instruction that instructs the first device to enable the short-range communication function or the short-range communication function.

When the instructions are executed by the first device, the first device performs the following step: in response to the received instruction, enabling the short-range communication function or the short-range communication function.

In a possible design, when the instructions are executed by the first device, the first device specifically performs the following step:

The first device sends the first key to the second device through NFC or Wi-Fi Aware.

In a possible design, when the instructions are executed by the first device, the first device specifically performs the following step:

The first device detects that a distance between the second device and the first device is less than a first threshold; and/or the first device detects that signal strength of the second device is greater than a second threshold.

In a possible design, the first threshold is a value in a range of 0 cm to 30 cm, and the second threshold is a value in a range of −5 dbm to −150 dbm.

In a possible design, the first device is a home device, the second device is a mobile terminal, and the control instruction is used to control the home device to be turned on or turned off, or to adjust a running parameter, where the home device includes one or more of a television, a sound box, a game console, a lighting device, a cleaning device, or a cooking device; or the first device is an office device, the second device is a mobile terminal, and the control instruction is used to control the office device to be turned on or turned off, or to adjust a running parameter, where the office device includes one or more of a projector, a printer, a copier, or a PC.

According to a seventh aspect, an embodiment of this application further provides an electronic device, including one or more processors, a memory, and one or more programs, where the one or more programs are stored in the memory, the one or more programs include instructions, and when the instructions are executed by the electronic device, the electronic device performs the method provided in any one of the second aspect to the fifth aspect.

According to an eighth aspect, an embodiment of this application further provides an electronic device, where the electronic device includes modules/units for performing the method provided in any one of the second aspect to the fifth aspect; and these modules/units may be implemented by using hardware, or may be implemented by executing corresponding software by hardware.

According to a ninth aspect, an embodiment of this application further provides a chip, where the chip is coupled to a memory in an electronic device, and is configured to invoke a computer program stored in the memory and perform the technical solution provided in any one of the first aspect to the fifth aspect of embodiments of this application. In this embodiment of this application, "couple" means that two components are directly or indirectly connected to each other.

According to a tenth aspect, an embodiment of this application further provides a computer-readable storage medium. The computer-readable storage medium includes a computer program. When the computer program is run on a computer, the computer performs the technical solution provided in any one of the first aspect to the fifth aspect.

According to an eleventh aspect, an embodiment of this application further provides a program product, including instructions. When the instructions are run on a computer, the computer performs the technical solution provided in any one of the first aspect to the fifth aspect.

According to a twelfth aspect, an embodiment of this application further provides a graphical user interface on an electronic device, and the electronic device has a display, one or more memories, and one or more processors, where the one or more processors are configured to execute one or more computer programs stored in the one or more memories, and the graphical user interface includes a graphical user interface displayed when the electronic device performs the technical solution provided in any one of the second aspect to the fifth aspect.

For beneficial effects of the second aspect to the twelfth aspect, refer to beneficial effects of the first aspect. Details are not described again.

BRIEF DESCRIPTION OF DRAWINGS

FIG. 4A-1 and FIG. 4A-2 are a schematic flowchart in which a second device becomes an owner of a first device according to an embodiment of this application;

DESCRIPTION OF EMBODIMENTS

Figure 1A:
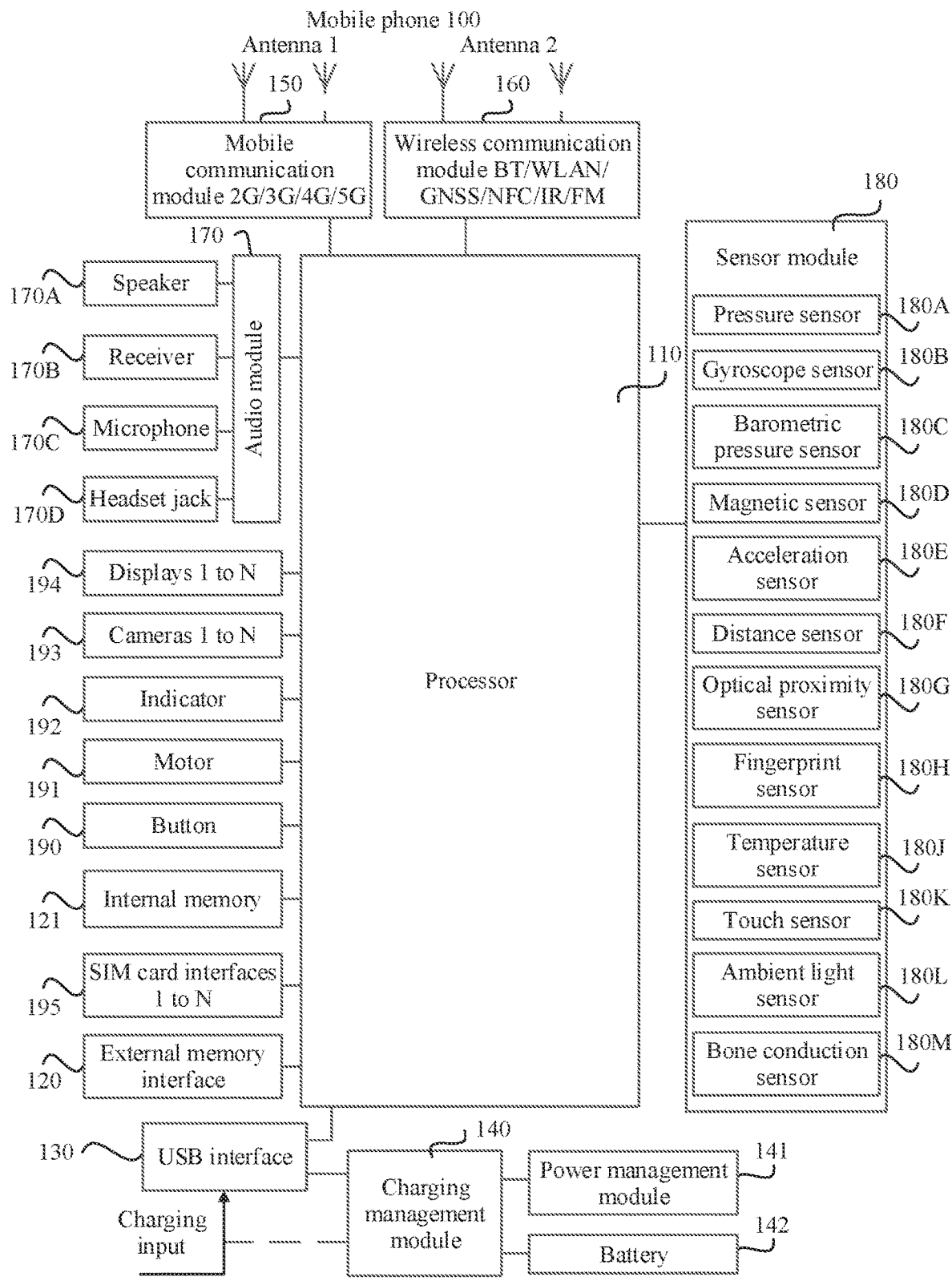
FIG. 1A is a schematic diagram of a hardware structure of an electronic device according to an embodiment of this application.

Some terms in embodiments of this application are explained below first, to facilitate understanding of a person skilled in the art.

(1) Application (Application, App)

An application is a software program that can implement one or more specific functions. Usually, a plurality of applications may be installed in an electronic device. For example, a camera application, an SMS application, an MMS application, various email applications, WeChat (WeChat), a Tencent chat software (QQ), WhatsApp Messenger, Line (Line), image sharing (instagram), Kakao Talk, and DingTalk may be installed in the electronic device. An application in the following may be an application installed when the electronic device is delivered from a factory, or may be an application (for example, an application sent by another electronic device) downloaded by a user from a network or obtained from another electronic device in a process of using the electronic device. The following uses Huawei AI Life as an example. However, this solution is also applicable to another type of application.

(2) Short-Distance Communication and Ultra-Short-Distance Communication

The short-range communication is, for example, a communication technology in which a communication distance is less than a first threshold, and the ultra-short-range communication is, for example, a communication technology in which a communication distance is less than a second threshold. The second threshold is less than the first threshold. For example, the second threshold may be any value in a range from 0 cm to 30 cm, for example, 30 cm, 20 cm, 10 cm, 5 cm, 4 cm, 3 cm, 2 cm or 1 cm. For example, the first threshold may be any value in a range of 30 cm to 10 m, for example, 10 m, 8 m, 5 m, 3 m, or 1 m. It should be noted that the values herein are only examples, and are not intended to specifically limit the first threshold and the second threshold.

Compared with short-distance communication, ultra-short-distance communication supports a shorter communication distance. For example, in an example scenario, a first device approaches a second device, to implement communication between the first device and the second device. Herein, "approach" may be understood as contact between two devices, or basically contact (for example, two devices are very close). In short, a distance between the two devices is very short, for example, within a range of 0 cm to 5 cm.

A device control right obtaining method provided in this application may be applicable to short-range communication, and may also be applicable to ultra-short-range communication. This document mainly uses ultra-short-range communication as an example for description. Because a communication distance supported by an ultra-short-range communication technology is very short, a probability of information being stolen is low, and security is high.

There are a plurality of technologies that support short-range communication, for example, Wi-Fi and Bluetooth. There are also a plurality of technologies that support ultra-short haul communication, for example, NFC, and a Wi-Fi Aware technology. The Wi-Fi Aware technology is responsible for sensing and discovery in the Wi-Fi technology, and can help a Wi-Fi device sense a surrounding service, for example, a surrounding device, so as to implement peer-to-peer (Peer to Peer, P2P) message exchange between two devices at a short distance by using the Wi-Fi Aware. Because Wi-Fi Aware can be used to sense a surrounding device, a plurality of functions may be implemented, for example, sensing a nearby person and establishing a connection, adding a friend, playing a same game; or discovering a surrounding device and implementing photo sharing or location sharing; or securely sending a file to a printer without accessing a network (for example, a cellular or wireless network).

It should be noted that, in addition to the NFC and Wi-Fi Aware listed above, with evolution of communication technologies, another ultra-short-range communication technology that may appear in the future may also be applicable to this solution. Alternatively, with further development of a current short-range communication technology (for example, a Bluetooth technology), ultra-short-range communication may also be supported in the future, and this solution may also be applicable.

(3) Temporary Control Right

The temporary control right may be obtained based on an ultra-short range communication technology. For example, at home, a user holds a mobile phone to approach a sound box, and the mobile phone obtains temporary control over the sound box by using an ultra-short-range communication technology (such as NFC or Wi-Fi Aware). When a validity period expires, the temporary control right is invalid, and if the mobile phone needs to continue to control the sound box, the mobile phone may obtain the temporary control right again. Because a communication distance supported by the ultra-short distance communication technology is very short, and a probability of information being stolen is low, security of obtaining a temporary control right based on the ultra-long distance communication technology is high Certainly, the temporary control right may alternatively be obtained by using the short-distance communications technology. This is not limited in this embodiment of this application. In this specification, an example in which a temporary control right is obtained by using the ultra-distance communication technology is mainly used, and a specific implementation process is described in detail hereinafter.

(4) Owner

A first device may control a second device by using a cloud. Before this, the first device needs to register with the cloud as an owner of the second device. In other words, the cloud records that the owner of the second device is the first device. In this way, the first device can control the second device by using the cloud. Compared to a temporary control right, this control manner is long-term. Unless the first terminal cancels becoming the owner of the second terminal, when the cloud records that the first device is no longer the owner of the second device, the first device cannot control the second device by using the cloud. For ease of description, this control manner by using a cloud is referred to as permanent control, long-term control, or the like in this specification. However, it should be noted that "permanent" or "long-term" does not mean "to the end" or "forever", but means that the second device can control the first device by using the cloud in a period in which a cloud side records that the second device is the owner of the first device.

A process in which the second device registers as the owner of the first device on the cloud side is described in the following Embodiment 1.

(4) In this application, "at least one" means one or more, and "a plurality of" means two or more. The term "and/or" describes an association relationship between associated objects, and indicates that three relationships may exist. For example. A and/or B may represent the following cases: Only A exists. both A and B exist, and only B exists, where A and B may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one item (piece) of a, b, or c may represent a, b, c, a and b, a and c, b and c, or a, b and c, where a, b, and c may be singular or plural.

In addition, unless otherwise stated, in embodiments of this application, ordinal numbers such as "first" and "second" are intended to distinguish between a plurality of objects, but are not intended to limit sizes, content, orders, time sequences, priorities, importance, or the like of the plurality of objects. For example, the first device, the second device, and a third device are merely used to distinguish between different devices, but do not indicate that the devices have different priorities, different importance degrees, or the like.

The device control right obtaining method provided in embodiments of this application may be applied to an electronic device. The following describes an electronic device, a graphical user interface (graphical user interface, GUI) used for the electronic device, and embodiments used for using the electronic device. In some embodiments of this application, the electronic device may be a portable electronic device, such as a mobile phone, a PAD, a portable computer, a wearable device (such as a smartwatch, smart glasses, a smart band, or a smart helmet) with a wireless communication function, or a vehicle-mounted device. An example embodiment of the portable electronic device includes but is not limited to a portable electronic device using iOS®, Android®, Microsoft®, or another operating system. It should be further understood that, in some other embodiments of this application, the electronic device may not be a portable device, for example, may be a desktop computer such as a PC, or may be a device such as a television.

For example, FIG. 1A is a schematic diagram of a structure of an electronic device 100.

It should be understood that the electronic device 100 shown in the figure is only an example, and the electronic device 100 may have more or fewer components than those shown in the figure, or may combine two or more components, or may have different component configurations. Components shown in the figure may be implemented by hardware including one or more signal processing and/or application-specific integrated circuits, software, or a combination of hardware and software.

As shown in FIG. 1A, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors. The controller may be a nerve center and a command center of the electronic device. The controller may generate an operation control signal based on instruction operation code and a time sequence signal, to complete control of instruction reading and instruction execution. A memory may be further disposed in the processor 110, and is configured to store instructions and data. In some embodiments, the memory in the processor 110 is a cache. The memory may store instructions or data that has been used or cyclically used by the processor 110. If the processor 110 needs to use the instruction or the data again, the processor may directly invoke the instruction or the data from the memory. This avoids repeated access, reduces waiting time of the processor 110, and improves system efficiency.

The USB interface 130 is an interface that conforms to a USB standard specification, and may be specifically a mini USB interface, a micro USB interface, a USB type-C interface, or the like. The USB interface 130 may be configured to connect to a charger to charge the electronic device, or may be configured to transmit data between the electronic device and a peripheral device. The charging management module 140 is configured to receive a charging input from the charger. The power management module 141 is configured to connect to the battery 142, the charging management module 140, and the processor 110. The power management module 141 receives input of the battery 142 and/or the charging management module 140, to supply power to the processor 110, the internal memory 121, an external memory, the display 194, the camera 193, the wireless communication module 160, and the like.

A wireless communication function of the electronic device may be implemented through the antenna 1, the antenna 2, the mobile communication module 150, the wireless communication module 160, the modem processor, the baseband processor, and the like. The antenna 1 and the antenna 2 are configured to transmit and receive electromagnetic wave signals. Each antenna in the electronic device may be configured to cover one or more communication bands. Different antennas may be multiplexed, to improve antenna utilization. For example, the antenna I may be multiplexed as a diversity antenna in a wireless local area network. In some other embodiments, an antenna may be used in combination with a tuning switch.

The mobile communication module 150 may provide a solution applied to the electronic device for wireless communication such as 2G/3G/4G/5G. The mobile communication module 150 may include at least one filter, a switch, a power amplifier, a low noise amplifier (low noise amplifier, LNA), and the like. The mobile communication module 150 may receive an electromagnetic wave through by using the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some function modules in the mobile communication module 150 may be disposed in the processor 110. In some embodiments, at least some function modules in the mobile communication module 150 may be disposed in a same component as at least some modules in the processor 110.

The wireless communication module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, or the like and that is applied to the electronic device. The wireless communication module 160 may be one or more components integrating at least one communications processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the electronic device, the antenna 1 and the mobile communication module 150 are coupled, and the antenna 2 and the wireless communication module 160 are coupled, so that the electronic device can communicate with a network and another device by using a wireless communication technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The display 194 is configured to display a display interface of an application, and the like. The display 194 includes a display panel The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device may include one or N displays 194, where N is a positive integer greater than 1.

The camera 193 may be configured to capture a static image or a video. The camera 193 may include a front-facing camera and a rear-facing camera.

The internal memory 121 may be configured to store computer-executable program code, and the executable program code includes instructions. The processor 110 runs the instructions stored in the internal memory 121, to perform various function applications of the electronic device and data processing. The internal memory 121 may include a program storage area and a data storage area. The program storage area may store an operating system, software code of at least one application (for example, iQIYI or WeChat), and the like. The data storage area may store data (for example, an image, a video) created in a use process of the electronic device. In addition, the internal memory 121 may include a high speed random access memory, or may include a non-volatile memory, for example, at least one magnetic disk storage device, a flash storage device, or a universal flash storage (universal flash storage, UFS).

The external memory interface 120 may be configured to connect to an external storage card, for example, a micro SD card, to extend a storage capability of the electronic device. The external storage card communicates with the processor 110 through the external memory interface 120, to implement a data storage function. For example, a file such as an image, a video is stored in the external storage card.

The electronic device may implement an audio function such as music playing or recording by using the audio module 170, the speaker 170A, the receiver 170B, the microphone 170C, the headset jack 170D, the application processor, and the like.

The pressure sensor 180A is configured to sense a pressure signal, and may convert the pressure signal into an electrical signal. In some embodiments, the pressure sensor 180A may be disposed on the display 194. The gyroscope sensor 180B may be configured to determine a motion posture of the electronic device. In some embodiments, an angular velocity of the electronic device around three axes (that is, axes x, y, and z) may be determined through the gyro sensor 180B.

The gyroscope sensor 180B may be configured to implement image stabilization during photographing. The barometric pressure sensor 180C is configured to measure barometric pressure. In some embodiments, the electronic device calculates an altitude based on a value of the barometric pressure measured by the barometric pressure sensor 180C, to assist in positioning and navigation. The magnetic sensor 180D includes a Hall sensor. The electronic device may detect opening and closing of a flip cover by using the magnetic sensor 180D. In some embodiments, when the electronic device is a flip phone, the electronic device may detect opening and closing of a flip cover by using the magnetic sensor 180D. Further, a feature such as automatic unlocking of the flip cover is set based on a detected opening or closing state of the leather case or a detected opening or closing state of the flip cover. The acceleration sensor 180E may detect a magnitude of acceleration of an electronic device in each direction (generally three axes), may detect a magnitude and a direction of gravity when the electronic device is still, and may be further configured to identify a posture of the electronic device, and is used in an application such as switching between a landscape mode and a portrait mode or a pedometer.

The distance sensor 180F is configured to measure a distance. The electronic device may measure the distance through infrared or laser. In some embodiments, in a photographing scenario, the electronic device may measure the distance by using the distance sensor 180F, to implement quick focusing. The optical proximity sensor 180G may include, for example, a light-emitting diode (LED) and an optical detector such as a photodiode. The light-emitting diode may be an infrared light-emitting diode. The electronic device emits infrared light by using the light-emitting diode. The electronic device detects reflected infrared light from a nearby object by using the photodiode. When detecting sufficient reflected light, the electronic device may determine that there is an object near the electronic device. When detecting insufficient reflected light, the electronic device may determine that there is no object near the electronic device. The electronic device may detect, by using the optical proximity sensor 180G, that the user holds the electronic device close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the electronic device is in a pocket, to avoid an unintentional touch. The fingerprint sensor 180H is configured to collect a fingerprint. The electronic device may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device executes a temperature processing policy by using the temperature detected by the temperature sensor 180J. For example, when the temperature reported by the temperature sensor 180J exceeds a threshold, the electronic device degrades performance of a processor near the temperature sensor 180J, to reduce power consumption and implement thermal protection. In some other embodiments, when the temperature is lower than another threshold, the electronic device heats the battery 142, to avoid an abnormal shutdown of the electronic device caused by a low temperature. In some other embodiments, when the temperature is lower than still another threshold, the electronic device boosts an output voltage of the battery 142, to avoid an abnormal shutdown caused by a low temperature.

The touch sensor 180K is also referred to as a "touch panel" The touch sensor 180K may be disposed in the display 194, and the touch sensor 180K and the display 194 constitute a touchscreen, which is also referred to as a "touchscreen". The touch sensor 180K is configured to detect a touch operation performed on or near the touch sensor 180K. The touch sensor may transfer the detected touch operation to the application processor to determine a type of a touch event. A visual output related to the touch operation may be provided on the display 194. In some other embodiments, the touch sensor 180K may be alternatively disposed on a surface of the electronic device, and is located on a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal.

The button 190 includes a power button, a volume button, and the like. The button 190 may be a mechanical button, may be a touch button. The electronic device may receive a button input, and generate a button signal input related to user settings and function control of the electronic device. The motor 191 may generate a vibration prompt. The motor 191 may be configured to produce an incoming call vibration prompt and touch vibration feedback. For example, touch operations performed on different applications (for example, photographing and audio playback) may correspond to different vibration feedback effects. The indicator 192 may be an indicator light, and may be configured to indicate a charging status and a power change, or may be configured to indicate a message, a missed call, a notification, or the like. The SIM card interface 195 is configured to connect to a SIM card. The SIM card may be inserted into the SIM card interface 195 or removed from the SIM card interface 195, to implement contact with or separation from the electronic device.

It may be understood that the components shown in FIG. 1A do not constitute a specific limitation on the mobile phone. The mobile phone in this embodiment of the present invention may include more or fewer components than those in FIG. 1A. In addition, a combination/connection relationship between the components in FIG. 1A may also be adjusted and modified.

Figure 1B:
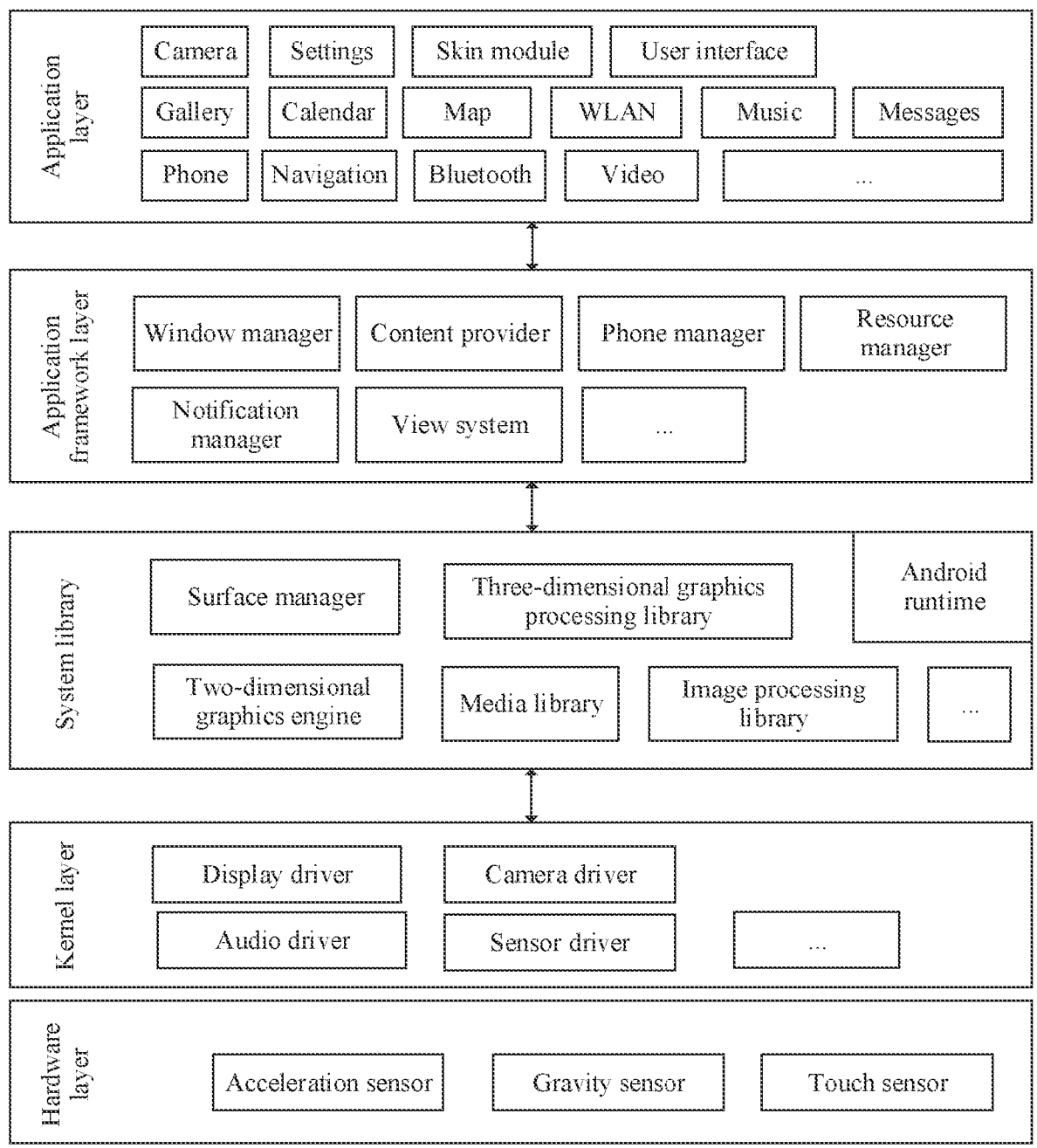
FIG. 1B is a schematic diagram of a software structure of an electronic device according to an embodiment of this application.

FIG. 1B is a block diagram of the software structure of the electronic device 100 according to an embodiment of this application.

As shown in FIG. 1B, the software structure of the electronic device 100 may be a layered architecture. For example, software may be divided into several layers, and each layer has a clear role and task. The layers communicate with each other through a software interface. In some embodiments, an Android system is divided into four layers: an application layer, an application framework (framework, FWK) layer, an Android runtime (Android runtime) and system library, and a kernel layer from top to bottom.

The application layer may include a series of application packages. As shown in FIG. 1B, the application layer may include "camera", "settings", a skin module, a user interface (user interface, UI), third-party applications, and the like. The third-party applications may include "WeChat", "QQ", "gallery", "calendar", "phone", "map", "navigation", "WLAN", "Bluetooth", "music", "video", "messages", and the like.

The application framework layer provides an application programming interface (application programming interface, API) and a programming framework for an application at the application layer. The application framework layer may include some predefined functions. As shown in FIG. 1B, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like. The content provider is configured to: store and obtain data, and enable the data to be accessed by an application. The data may include a video, an image, audio, calls that are made and received, a browsing history and bookmarks, an address book, and the like.

The view system includes visual controls such as a control for displaying a text and a control for displaying an image. The view system may be configured to construct an application. A display interface may include one or more views. For example, a display layout including an SMS message notification icon may include a text display view and an image display view.

The phone manager is configured to provide a communication function of the electronic device, for example, management of a call status (including answering or declining).

The resource manager provides various resources such as a localized character string. an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is used to notify download completion, give a message notification. The notification manager may alternatively be a notification that appears in a top status bar of the system in a form of a graph or a scroll bar text, for example, a notification of an application running on the background, or may be a notification that appears on the screen in a form of a dialog window. For example, text information is displayed in the status bar, an alert sound is played, the electronic device vibrates, or the indicator light blinks.

The Android runtime includes a core library and a virtual machine. The Android runtime is responsible for scheduling and management of the Android system.

The kernel library includes two parts: a function that needs to be invoked in java language and a kernel library of Android. The application layer and the application framework layer run on the virtual machine. The virtual machine executes java files of the application layer and the application framework layer as binary files The virtual machine is configured to implement functions such as object lifecycle management, stack management, thread management. security and exception management, and garbage collection.

The system library may include a plurality of function modules, for example, a surface manager (surface manager), a media library (media library), a three-dimensional graphics processing library (for example, an OpenGL ES), and a 2D graphics engine (for example, an SGL).

The surface manager is configured to manage a display subsystem and provide fusion of 2D and 3D layers for a plurality of applications.

The media library supports play and recording in a plurality of commonly used audio and video formats, static image files, and the like. The media library may support a plurality of audio and video encoding formats such as MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

In addition, the system library may further include a backup determining module, configured to determine whether a file exists in a backed-up list. For example, when the file exists in the backed-up list, the backup determining module determines that the file does not need to be backed up. For another example, when the file does not exist in the backed-up list, the backup determining module determines that the file needs to be backed up.

The kernel layer is a layer between hardware and software. The kernel layer includes at least a display driver, a camera driver, an audio driver, and a sensor driver.

The hardware layer may include various types of sensors, for example, an acceleration sensor, a gyroscope sensor, and a touch sensor in this embodiment of this application.

The following uses an example in which a second device obtains a control right over a first device to describe some working processes of software and hardware of the electronic device 100.

For example, the touch sensor 180K on the first device receives a touch operation of the user, and a corresponding hardware interruption is sent to the kernel layer. The kernel layer processes the touch operation into an original input event (including information such as touch coordinates and a time stamp of the touch operation). The original input event is stored at the kernel laver. The application framework layer obtains the original input event from the kernel layer. and identifies a control corresponding to the input event. For example, the touch operation is a touch and tap operation, and a control corresponding to the tap operation is a Wi-Fi icon. A Wi-Fi module invokes an interface of the application framework layer to enable Wi-Fi, for example, enable a Wi-Fi Aware function. Likewise, the user may enable a Wi-Fi Aware function on the second device. In this case, the second device may discover the first device by using Wi-Fi Aware, and the first device may also discover the second device by using the second device. When discovering the second device, the first device sends a key to the second device by using a Wi-Fi Aware technology. After receiving the key, the second device obtains the temporary control right over the first device. For example, the second device sends a control instruction encrypted by using the key to the first device, and when receiving the encrypted control instruction, the first device performs decrypting by using a corresponding key, obtains specific content of the control instruction, and executes the control instruction. In this way, the second device temporarily controls the first device.

It should be noted that the foregoing uses an example in which the first device and the second device communicate with each other by using Wi-Fi Aware. It may be understood that another ultra-short-distance communication technology is also feasible, and this is not limited in this embodiment of this application.

Figure 2:
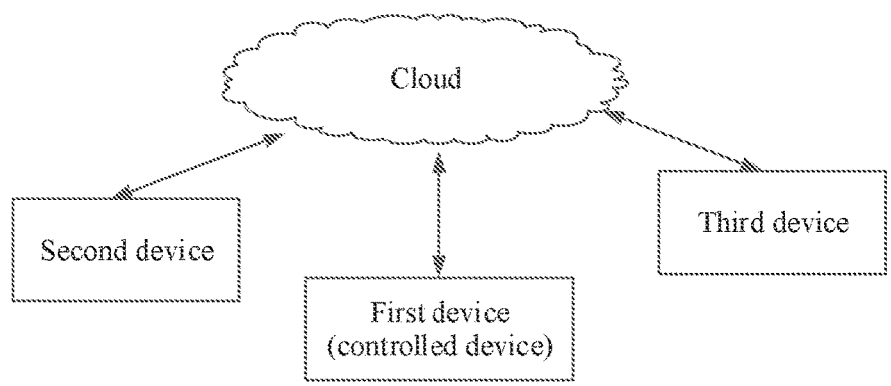
FIG. 2 is a schematic diagram of a communication system according to an embodiment of this application.

This application may be applicable to a system including a plurality of devices. For example, refer to FIG. 2. FIG. 2 is a schematic diagram of a system according to this application. As shown in FIG. 2, the system includes a first device, a second device, and a third device. The first device is a controlled device. The second device or the third device may be an owner of the first device. For example, the second device is the owner of the first device. If the third device also needs to control the first device, the third device may obtain a control right over the first device.

A manner is as follows: A user enters a third user account of the third device on the owner of the first device (that is, the second device), and the second device sends a sharing application to a cloud, to request the cloud to change the owner of the first device to the third device. After receiving the sharing application, the cloud may record that the owner of the first device is changed to the third device. In this case, the third device may remotely control the first device by using the cloud, that is, obtain a permanent control right over the first device.

Another manner is as follows: The user uses the owner of the first device (that is, the second device) to scan a QR code set on the third device to obtain the third user account of the third device, and then obtains the permanent control right over the first device in the foregoing manner.

Still another manner is as follows: The user discovers a plurality of to-be-shared devices on the owner of the first device (that is, the second device), and the user selects one of the to-be-shared devices, that is, the third device. Then, the second device sends a sharing creation application to the cloud, and the cloud returns a shareCode. The owner sends the shareCode to the third device (for example, by using an instant messaging application), and the third device sends a confirmation instruction to the cloud, where the confirmation instruction includes the shareCode. After receiving the confirmation instruction, the cloud changes the owner of the first device from the second device to the third device based on the shareCode in the confirmation instruction.

It should be noted that, in the foregoing three manners, the owner of the first device actively shares the permanent control right over the first device with the third device. When a plurality of devices expect to obtain the permanent control right over the first device, if an owner actively shares the control right with each device, an operation is complex and pressure of the owner of the first device is high.

In view of this, an embodiment of this application provides a manner of obtaining a device control right. In this manner, the third device may obtain a temporary control right of the first device by using an ultra-short-distance communication technology (or a short-distance communication technology), and the owner of the first device does not need to actively share the temporary control right. Therefore, an operation is simple, and pressure of the owner of the first device is low.

The first device may be, for example, various types of home appliance devices in a home, and various office devices in an office. The home appliance device is, for example, a television, a sound box, a game console, a lighting device (such as a table lamp, a chandelier in a bedroom or a living room), a cooking-related device that is referred to as a cooking device, (such as a smart rice cooker, a cooker hood, a water heater, or a refrigerator), and a cleaning device (such as a floor-scanning robot, a washing machine, or a clothes-drying device). The office device is, for example, a printer, a copier, a projector, a PC, a water dispenser, and a coffee machine.

The second device or the third device may be a mobile phone, a tablet computer, a wearable device such as glasses, a watch, or a band, a remote control, a stylus, or the like. A specific type is not limited. The third device and the second device may be the same. For example, both the third device and the second device are mobile phones, tablet computers, or bands. Alternatively, the third device and the second device may be different. For example, one of the third device and the second device is a mobile phone, and the other is a tablet computer; or one is a mobile phone, and the other is a band. A specific combination form is not limited.

The device control right obtaining method provided in this embodiment of this application may be applied to a plurality of scenarios, for example, the following scenarios:

Scenario 1: Home Scenario

Figure 3:
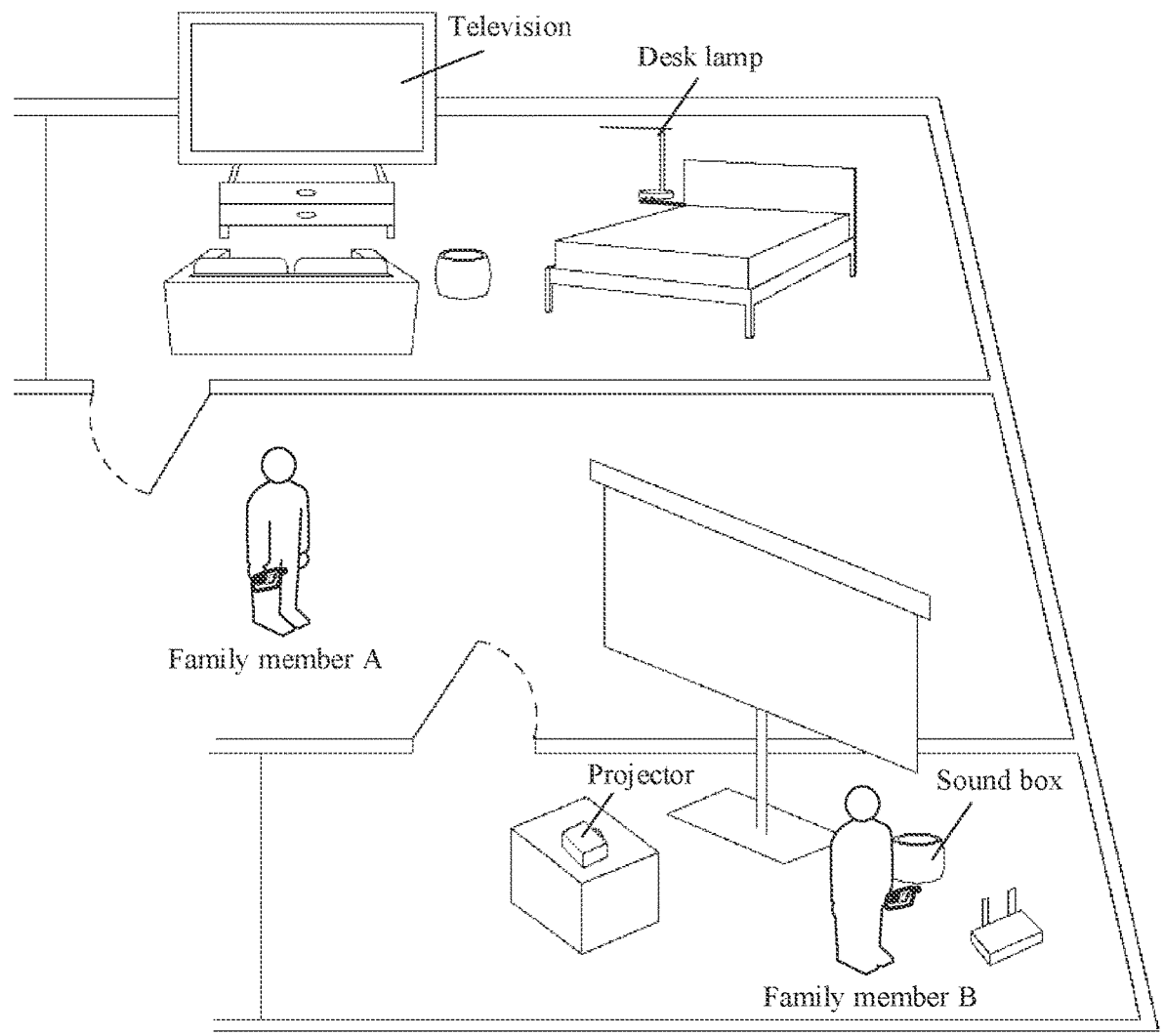
FIG. 3 is a schematic diagram of an application scenario according to an embodiment of this application.

FIG. 3 is a schematic diagram of a home scenario according to an embodiment of this application. As shown in FIG. 3, a television set, a sound box, a table lamp, a projector, and the like are disposed in a home, and certainly, a refrigerator, an air conditioner, a curtain, and the like (not shown in the figure) are also included. In addition, the family includes a family member A and a family member B. The sound box is used as an example, a mobile phone A of the family member A or a mobile phone B of the family member B may obtain a temporary control right over the sound box by using an ultra-short-distance communication technology. For example, a Wi-Fi Aware function is enabled on the mobile phone A of the family member A (for description of Wi-Fi Aware, refer to a foregoing term explanation part), and the Wi-Fi Aware function is also enabled on the sound box. The sound box may discover the mobile phone A. For example, when determining that a distance between the mobile phone A and the sound box is less than a threshold, the sound box sends a key to the mobile phone A, and the mobile phone A encrypts a control instruction based on the key, where the control instruction is used to control the sound box. The mobile phone A sends the encrypted control instruction to the sound box, and the sound box decrypts the encrypted control instruction by using a corresponding key, obtains specific content of the control instruction, and executes the control instruction. In this way, control on the sound box is implemented (for example, music playing and pause may be controlled). If the family member B wants to control the sound box, the family member B may also obtain the temporary control right over the sound box in a same manner, and then control the sound box.

Optionally, an owner may have been configured for the sound box. In this case, whether to allow another person to obtain the temporary control right over the sound box may depend on willingness of the owner. For example, if the owner wants another person to obtain the temporary control right over the sound box, the sound box may be preset to be in an open mode, and in the open mode, the another device may obtain the temporary control right over the sound box. Certainly, if the owner does not want another person to obtain the temporary control right over the sound box, the owner may disable the open mode of the sound box.

Optionally, in order to prevent any person (for example, a non-family member) from obtaining the temporary control right over the sound box, before the temporary control right over the sound box is obtained, consent of the owner is further obtained, and the temporary control right over the sound box may be obtained with the consent of the owner.

Optionally, that the temporary control right over the sound box has valid duration may be understood as that the temporary control right is valid within specific duration, and is invalid when the duration expires. In this way, unlimited control over the sound box can be avoided. For example, the family member B is a middle school student. In order to avoid unlimitedly using the sound box by the middle school student, which affects learning, the middle school student has the temporary control right over the sound box for only one hour, half an hour, or the like. Certainly, the family member B may alternatively obtain the permanent control right over the sound box, that is, become the owner of the sound box. This is not limited in this application. Likewise, if the family further includes a family member C, the family member C may also obtain the temporary control right or the permanent control right over the sound box.

Scenario 2: Office Scenario

For example, a printer is disposed in an office. When an employee in the office needs to print a document, the employee may obtain a temporary control right over the printer to perform printing. For example, an employee A holds a mobile phone A to approach the printer. When detecting that the mobile phone A approaches (for example, a distance is less than a threshold), the printer sends a key to the mobile phone A. The mobile phone A encrypts a control instruction by using the key, where the control instruction is used to control the printer. The mobile phone A sends the encrypted control instruction to the printer, and the printer decrypts the encrypted control instruction by using a corresponding key, to obtain and execute the control instruction.

Optionally, the printer may be configured with an owner (for example, an office administrator). When the owner enables an open mode of the printer, another user can obtain the temporary control right over the printer. Otherwise, other users cannot obtain the temporary control right over the printer.

Optionally, in order to prevent any person (for example, a non-office employee) from obtaining the temporary control right over the printer, before the temporary control right over the printer is obtained, consent of the owner is further obtained, and the temporary control right over the printer may be obtained with the consent of the owner. Optionally, that the temporary control right over the printer has valid duration, that is, the temporary control right is valid within specific duration, and is invalid when the duration expires. In this way, the employee is prevented from using the printer unlimitedly.

Scenario 3: Shopping Mall Scenario

For example, a shopping mall of a home appliance is used as an example. To attract consumers for shopping, the shopping mall may display a plurality of types of home appliances, and a mobile phone of a consumer may obtain a temporary control right of a home appliance, to experience performance of the home appliance. For example, a consumer A holds a mobile phone A to approach a home appliance in a store. When detecting that the mobile phone A is approaching (for example, a distance is less than a threshold), the home appliance sends a key to the mobile phone A. The mobile phone A encrypts a control instruction by using the key, where the control instruction is used to control the home appliance. The mobile phone A sends the encrypted control instruction to the home appliance, and the home appliance decrypts the encrypted control instruction by using a corresponding key, to obtain and execute the control instruction.

Optionally, when an owner (for example, a store employee) is configured for the home appliance, the owner may preset the home appliance to be in an open mode, and in the open mode, a consumer may obtain a temporary control right over the home appliance.

Optionally, in order to control the temporary control right over the home appliance, before obtaining the temporary control right over the household appliance, the consumer further needs to obtain consent of the owner, and may obtain the temporary control right over the home appliance with the consent of the owner. Optionally, the temporary control right over the home appliance has valid duration, that is, the temporary control right is valid within specific duration, and is invalid when the duration expires. In this way, the consumers are prevented from controlling the home appliance unlimitedly.

The foregoing describes several example application scenarios provided in embodiments of this application. Certainly, in addition to the foregoing scenarios, embodiments of this application may be further applied to other scenarios. Examples are not listed one by one in this application.

The following uses the application scenario shown in FIG. 3 as an example to describe in detail the device control right obtaining method provided in this embodiment of this application. The speaker is used as the first device, the mobile phone A of the family member A is used as the second device, and the mobile phone B of the family member B is used as the third device.

The following first describes a process in which the second device becomes the owner of the first device, and then describes a process in which the third device obtains the temporary control right over the first device. Specifically, the following Embodiment 1 to Embodiment 4 are included.

Embodiment 1

Embodiment 1 describes a process in which a second device becomes an owner of a first device, that is, a process of obtaining a permanent control right over the first device. Embodiment 1 relates to FIG. 4A-1 to FIG. 4D.

Figures 1, 4A:
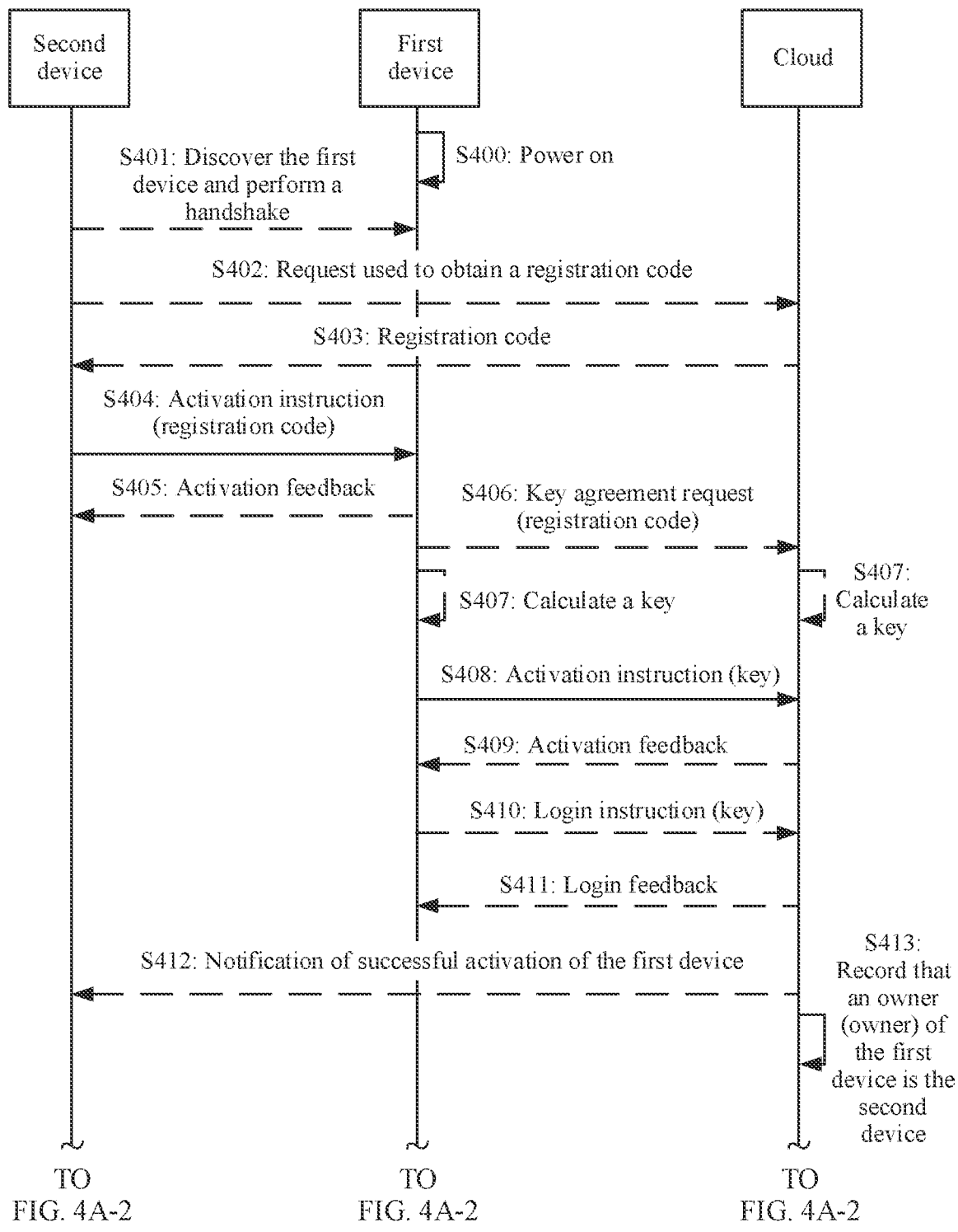
Figures 2, 4A:
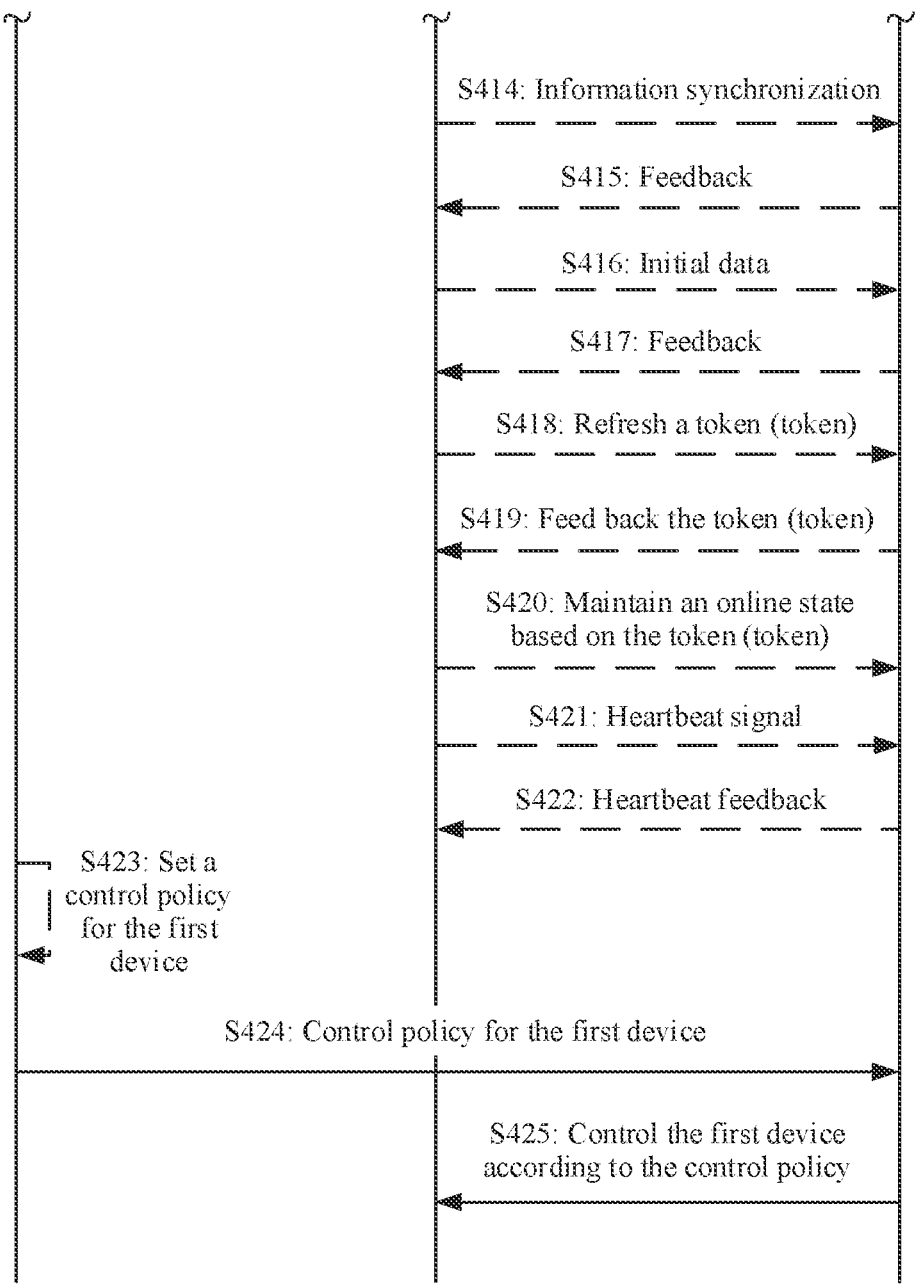

FIG. 4A-1 and FIG. 4A-2 are a schematic flowchart in which the second device obtains the permanent control right over the first device according to this embodiment of this application. As shown in FIG. 4A-1 and FIG. 4A-2, this procedure includes the following steps.

S400: The first device is turned on. For example, the device is powered on for a first time after delivery.

S401: The second device discovers the first device and performs a handshake with the first device.

There are a plurality of manners in which the second device discovers the first device. For example, a user enables a Wi-Fi Aware function on the second device, and enables a Wi-Fi Aware function on the first device, and the second device and the first device may discover each other by using the Wi-Fi Aware function. For example, the second device is a mobile phone. For example, the user may perform a down-sliding operation on a status bar on a top of a screen of the mobile phone, to display a notification panel on the screen of the mobile phone. The user taps a Wi-Fi icon on the notification panel, to enable the Wi-Fi Aware function. For example, the first device is a sound box. After the sound box is powered on, the Wi-Fi Aware function may be automatically enabled, or a button is set on the sound box, and the user controls audio and enables the Wi-Fi Aware function by using the button. When the first device enables the Wi-Fi Aware function, the first device broadcasts a signal. When detecting the signal broadcast by the first device, the second device discovers the first device. The signal broadcast by the first device includes, for example, a name, a manufacturer, a type, or a device number of the first device. Certainly, in addition to Wi-Fi Aware, the second device may further discover the first device in another manner, for example, by using Bluetooth.

Alternatively, the user may further hold the second device and touch the first device, for example, touch an NFC area on the first device by using an NFC area on the second device, to implement discovering of the first device by the second device.

Alternatively, a first application is installed on the first device, and a second application is installed on the second device. The first application and the second application may be a same application or different applications. The user may start the first application on the first device, and also start the second application on the second device. The first application on the first device may provide a QR code, and the user scans the QR code by using the second application on the second device, to implement a process in which the second device discovers the first device.

Alternatively, the second device may further scan a product QR code pasted on a housing of the first device to discover the first device.

It should be noted that the foregoing several manners are examples of manners in which the second device discovers the first device. In addition to the foregoing manners, the second device may further discover the first device in another manner. A specific manner is not limited.

After discovering the first device, the second device may perform the handshake with the first device. For example, the second device sends a "hello" instruction to the first device. After receiving the "hello" instruction, the first device feeds back a "hi" instruction to the second device.

Optionally, the foregoing S401 may not be performed (which is represented by a dashed line in the figure). In other words, the second device may directly perform S402, that is, the second device does not need to discover the first device and perform the handshake with the first device, and may directly apply for a registration code from a cloud (that is, S402), and then send the registration code to the first device (that is, S404).

S402: The second device sends, to the cloud, a request used to obtain the registration code.

The cloud may be various types of servers, for example, may be one server or a set of a plurality of servers; or may be one chip or a set of a plurality of chips in one server; or may be a set of a plurality of chips in a plurality of servers.

S403: The cloud sends the registration code to the second device.

It may be understood that, before S403, the method may further include the following step: The cloud generates the registration code. A purpose of requesting, by the second device, the registration code of the first device from the cloud is to request the cloud to record an association relationship between the second device and the registration code. For example, the association relationship may be, for example, a mapping relationship in Table 1:

TABLE 1

| Registration code | Device requesting registration code |
| --- | --- |
| AAAAAA | Second device (for example, Huawei mobile phone P40) |

Optionally, before S403, the second device already logs in to the cloud. A HUAWEI AI Life app on the second device is used as an example. After starting the HUAWEI AI Life app, the second device logs in to a second user account. The HUAWEI AI Life app logs in to the cloud based on the second user account. Therefore, the second user account is identified as a device on a cloud side. The second user account herein may be, for example, a Huawei system account, an email account, a mobile phone number, or an IMEID code. A Huawei system account is used as an example. Optionally, considering that one Huawei system account is used to log in to a plurality of devices, the cloud side may perform identification by using a combination of the Huawei system account and a device identifier. For example, Huawei system account A+mobile phone identifier is identified as one device, and Huawei system account A+tablet computer is identified as another device. For ease of description, an example in which a Huawei system account is used to log in to only one device is used. In this case, a column of device requesting registration code is located in Table 1 may be a Huawei system account used to log in to the Huawei AI Life app of the second device. For example, if the Huawei system account is a mobile phone number 156 8090 XXXX, Table 1 may be detailed into Table 2:

TABLE 2

| Registration code | Device requesting registration code |
| --- | --- |
| AAAAAA | 156 8090 XXXX |

In some embodiments, S402 and S403 may not be performed. For example, the second device does not need to request the registration code from the cloud, and the second device may generate the registration code, or the registration code is preconfigured, or the user sets the registration code. The second device may separately send the registration code to the first device and the cloud. After the first device sends an activation instruction including the registration code to the cloud, the cloud compares the registration code from the second device with the registration code from the first device. If the registration code from the second device and the registration code from the first device are consistent, the cloud may record that the second device is the owner of the first device.

S404: The second device sends an activation instruction to the first device, where the activation instruction instructs the first device to perform activation. The activation instruction may include the registration code (for example, AAAAAA in the foregoing table).

Figure 4B:
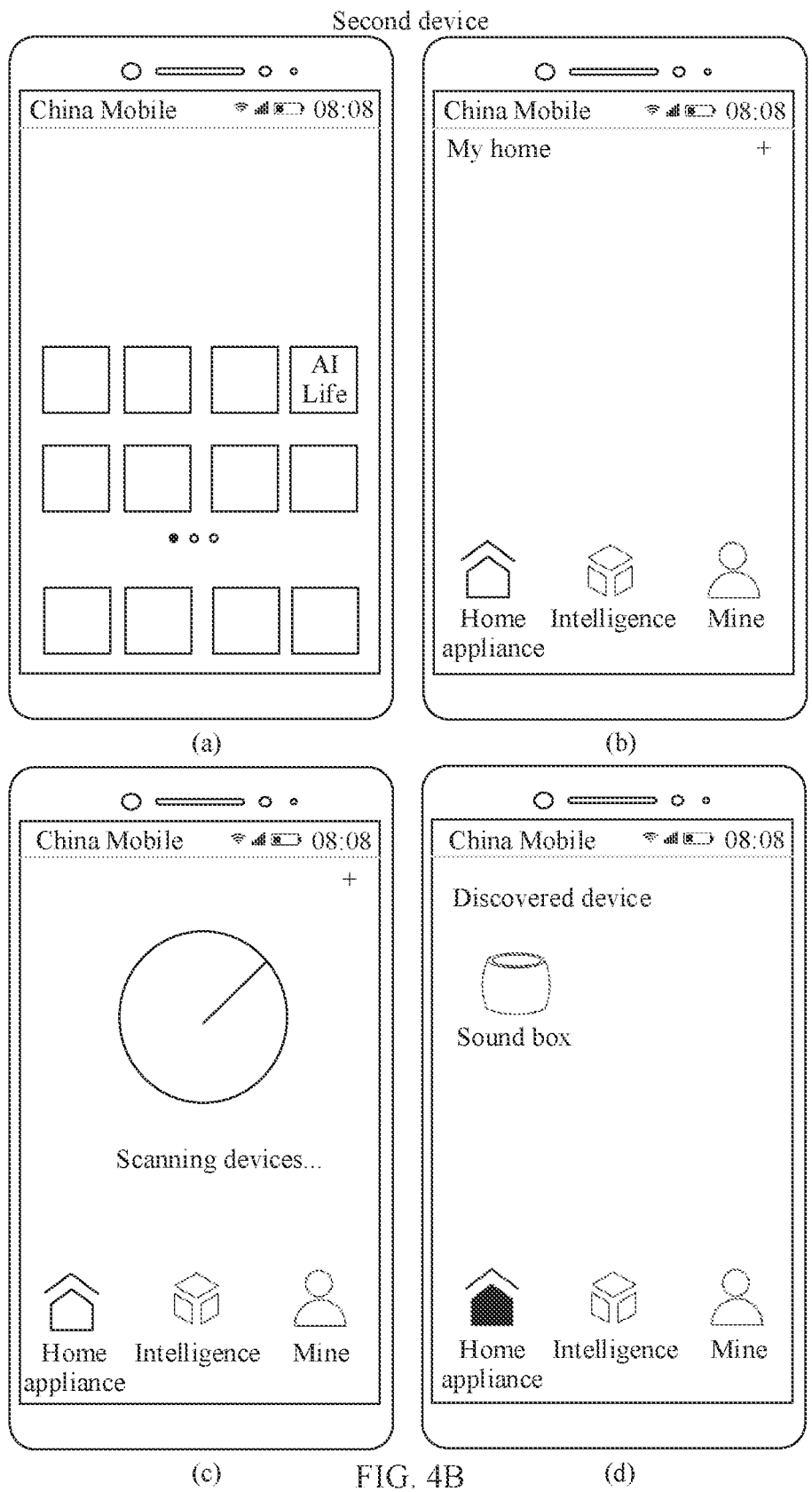
FIG. 4B to FIG. 4D are schematic diagrams of GUIs of a second device according to an embodiment of this application.
Figure 4C:
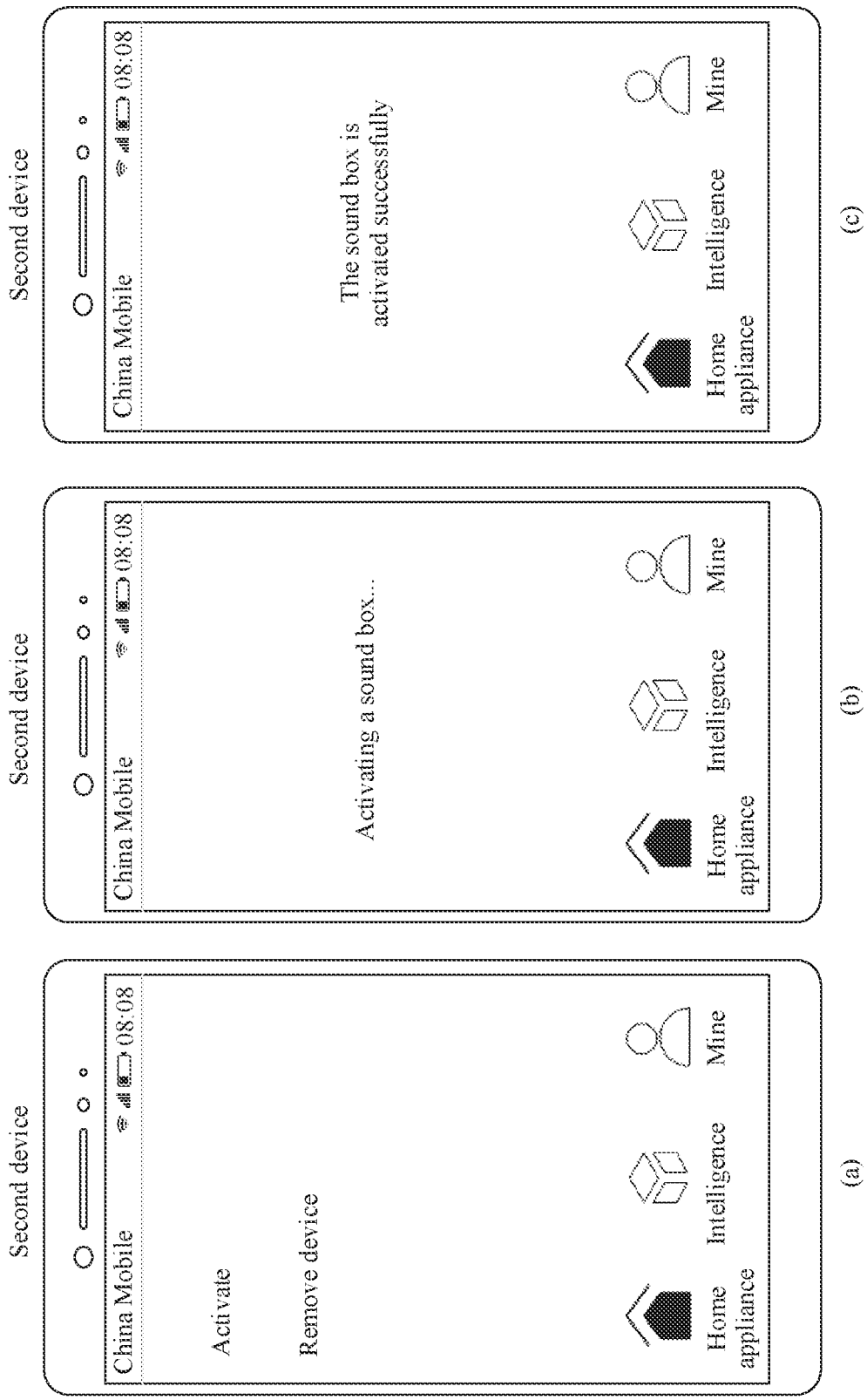

Optionally, before activating the first device, the second device may further determine whether it is detected that the user triggers an operation for activating the first device. If the operation for activating the first device is detected, the second device sends the activation instruction to the first device in response to the operation. For example, refer to (a) in FIG. 4B. which is a schematic diagram of a desktop of the second device. The desktop includes icons of various applications, including an icon of an AI Life application. In response to an operation on the icon, the second device displays an interface shown in (b) in FIG. 4B. The interface includes a "+" button. In response to an operation on the "+" button, the second device displays an interface shown in (c) in FIG. 4B. The interface prompts that the second device is discovering a device. When the device is discovered, an interface shown in (d) in FIG. 4B is displayed. The interface includes an identifier of the discovered first device (for example, a sound box), and the identifier may be one or more of a name, a model, or an icon of the device. After the first device is powered on for the first time after delivery, the first device is not registered with the cloud. Therefore, in response to an operation on an icon of the first device (for example, a sound box) in the interface shown in (d) in FIG. 4B, an interface shown in (a) in FIG. 4C is displayed. The interface includes an "activate" button, and the "activate" button is used to activate the first device. Therefore, the foregoing operation for activating the first device may be an operation of tapping the activation button in (a) in FIG. 4C. Certainly, the operation may be another operation, for example, a voice instruction used to activate the first device. This is not specifically limited.

S405: The second device receives an activation feedback of the first device.

For example, the activation feedback may be successful activation, failed activation. being activated, or the like. S405 may be performed or may not be performed. For example, refer to (a) in FIG. 4C and (b) in FIG. 4C. In response to the operation of tapping the "activate" button, the second device displays prompt information of "The sound box is being activated", and the sound box herein is the first device.

S406: The first device sends a key agreement request to the cloud, where the key agreement request is used to request to negotiate a key with the cloud.

In S404, the second device sends the registration code to the first device. Therefore, the key agreement request sent by the first device to the cloud may include the registration code. Because the cloud already records that a device that applies for the registration code from the cloud is the second device (for example, Table 1 or Table 2), after receiving the key agreement request sent by the first device, the cloud may establish an association relationship between the second device and the first device based on the registration code in the key agreement request. For example, after S406, S413 may be immediately performed (which is described in the following). However, because the first device does not log in to the cloud successfully, the cloud may temporarily not establish the association relationship between the second device and the first device. When the first device successfully logs in to the cloud, the cloud establishes the association relationship between the second device and the first device, that is, performs S413. A process in which the first device logs in to the cloud includes the following steps S407 to S411.

S407: The first device and the cloud separately calculate a key.

Optionally, because there is a long link between the first device and the cloud, it should be avoided as much as possible that one party directly sends a calculated key to the other party, so that the key is leaked in a key transmission process. Therefore, the first device and the cloud may separately calculate the key. For example, the first device and the cloud use a same key encryption algorithm to calculate an encryption key, and use a same key decryption algorithm to perform decryption. For example, the key agreement request in S406 includes the key encryption algorithm and the key decryption algorithm that are used by the first device, and the cloud uses the same algorithms, that is, the first device and the cloud agree on the key encryption algorithm and the key decryption algorithm, and do not directly transfer the key.

Optionally, S406 and S407 may not be performed. For example, a key is preconfigured in the first device, and the key does not need to be calculated. Alternatively, the user of the first device may set a key. Alternatively, in subsequent steps such as S408, encryption may be performed without a key.

S408: The first device sends an activation instruction to the cloud, where the activation instruction instructs to activate the first device on the cloud.

For example, the activation instruction may be obtained through encryption by using the key calculated by the first device. The cloud decrypts the encrypted activation instruction by using the agreed key decryption algorithm, and activates the first device if the decryption succeeds.

S409: The first device receives an activation feedback sent by the cloud.

The activation feedback may include successful activation or failed activation. Optionally, S409 may be performed or may not be performed.

S410: The first device logs in to the cloud.

For example, the user enters a first user account and a password on the first device, and logs in to the cloud by using the first user account and the password. The first user account and the foregoing second user account of the second device may be the same or different. For example, the first user account the foregoing second user account of the second device are a same Huawei system account. Alternatively, the user may enter the first user account and the password of the first device on the second device, then the second device sends the first user account and the password to the first device, and the first device sends the first user account and the password to the cloud.

S411: The first device receives a login feedback sent by the cloud.

After the cloud performs verification on the first user account and the password, if the verification succeeds, the cloud may send the login feedback, for example, successful login, to the first device. Certainly, if the verification fails, feedback indicating failed login may alternatively be sent to the first device.

In this case, the first device successfully logs in to the cloud. To improve security, the cloud may allocate a virtual ID to the first device. For example, a string of characters or digits randomly generated by the cloud are used as a virtual ID that uniquely identifies the first device. In this way, communication between the first device and the cloud may not need to carry the first user account of the first device, because the first user account may be a mobile phone number of the user, and the communication between the first device and the cloud is a long link, a possibility of being attacked is high, which may cause mobile phone number leakage. For security purposes, the first device may interact with the cloud based on the virtual ID allocated by the cloud, to avoid directly exposing the first user account. Definitely, the cloud may also allocate, to the second device, a virtual ID used to uniquely identify the second device, and a principle is the same.

S412: The second device receives a successful activation notification sent by the cloud.

As described above, the cloud already records the association relationship (for example, Table 1 or Table 2) between the second device and the registration code. After the first device is activated based on the registration code and logs in to the cloud, the cloud may send, to the second device, a notification indicating that the first device is successfully activated. Alternatively, after S411, the first device may send a successful activation notification to the second device. For example, refer to (c) in FIG. 4C. The second device displays prompt information of "The sound box is successfully activated", and the sound box is the first device.

S410 to S412 may not be performed. That is, after the first device sends the activation instruction to the cloud, the cloud directly performs S413, that is, completes the process in which the second device registers as the owner of the first device.

S413: The cloud records the association relationship between the first device and the second device, that is, the owner of the first device is the second device.

Optionally, after the first device logs in to the cloud, the cloud identifies the first device by using the first user account (or the allocated virtual ID) of the first device. Therefore, the association relationship between the first device and the second device is actually an association relationship between the first user account and the second user account. An example in which the second user account is a mobile phone number and the first user account is a sound box identifier is used. Refer to Table 3. Table 3 is an example of the association relationship between the first device and the second device.

TABLE 3

| First device | Second device (owner of first device) |
|---|---|
| HUAWEI sound box AM08 | 156 8090 XXXX |

After logging in to the cloud, the first device may maintain an online state on the cloud. For example, the following steps S414 to S422 are included.

S414: Synchronize information about the first device to the cloud. The information is, for example, a type, a model, or a manufacturer of the first device.

S415: The first device receives a synchronization feedback sent by the cloud. S415 is an optional step, and may be performed or may not be performed.

Optionally, the foregoing step S414 is preferably performed, so that the cloud can accurately identify the first device based on synchronization information reported by the first device. Certainly, S414 may not be performed. For example, the activation instruction sent by the first device in S408 may carry the information about the first device, and S414 may not be performed.

S416: Report initial data of the first device to the cloud. The initial data is, for example, running status information of a device. The running status information indicates, for example, that the device is in an on state or an off state. For example, the device is a table lamp, and the running information may further include current luminance information and the like. Alternatively, the initial data further includes a parameter set by the user for the first device. For example, the first device is a sound box, and the initial data of the sound box may include, for example, song information in the sound box. Alternatively, if the user sets a power-on password of the first device, the initial data may further include a power-on password.

S417: The cloud sends feedback of reporting the initial data of the first device. S417 is an optional step, and may be performed or may not be performed.

Optionally, step S416 is preferably performed, so that the cloud can accurately determine a status of the first device based on the running status information reported by the first device. Certainly, S416 may not be performed. This is not limited in this embodiment of this application.

In the foregoing embodiment, a process in which the first device completes activation and logs in to the cloud is described. It may be understood that the first device needs to be in a login state, so that the cloud can deliver a control instruction to the first device in real time. For a process in which the first device is in the login state, refer to steps S418 to S422.

S418: The first device requests the cloud to refresh a token of the first device.

S419: The first device receives the token.

S420: The first device maintains the online state on the cloud based on the token.

When S410 is performed, that is, after the first device logs in successfully, the cloud may generate a token (token), store the token, and then return a token value to the first device. After receiving the token, the first device stores the token. When the first device sends information to the cloud, the token and the first user account are carried and sent to the cloud together. After receiving the information sent by the first device, the cloud reads the token and compares the token with the stored token value. If token comparison is successful, it indicates that the first user account is in the login state; otherwise, it indicates that the login state of the first user account is invalid, and re-login is required. Generally, a validity period of a token is short, for example, two days, one day, six hours, or three hours.

Optionally, S418 to S420 may be performed periodically, for example, performed once after a period of time, or performed once each time the first device logs in to the cloud. Updating of the key helps prevent another device from stealing an original key to log in to the cloud to replace the first device.

Alternatively, S418 to S420 may not need to be performed. For example, in S411, the cloud adds the token to the login feedback, and then the first device can keep online by using the token, and does not need to request the cloud to refresh the token. For another example, the first device and the cloud predetermine a token before delivery, and the cloud does not need to feed back the token to the first device.

S421: Report a heartbeat signal of the first device to the cloud.

S422: The first device receives a heartbeat feedback sent by the cloud.

The first device may periodically send a heartbeat signal to the cloud, to maintain the online state on the cloud.

S421 to S422 are optional steps, and may be performed or may not be performed.

When the cloud records that the owner of the first device is the second device, the second device may control the first device by using the cloud. For example, this may be implemented by performing the following steps S423 to S425.

S423: The second device sets a control policy for the first device.

For example, refer to 4D. The second device displays a setting interface of the control policy, where the setting interface includes a control condition, for example, 8 a.m., and further includes a control manner, for example, turning on a sound box and playing a song "xxx".

Optionally, S423 may be performed or may not be performed. For example, the control policy is set by default before the second device is delivered from a factory, and does not need to be set.

S424: The second device sends the control policy for the first device to the cloud.

Figure 4D:
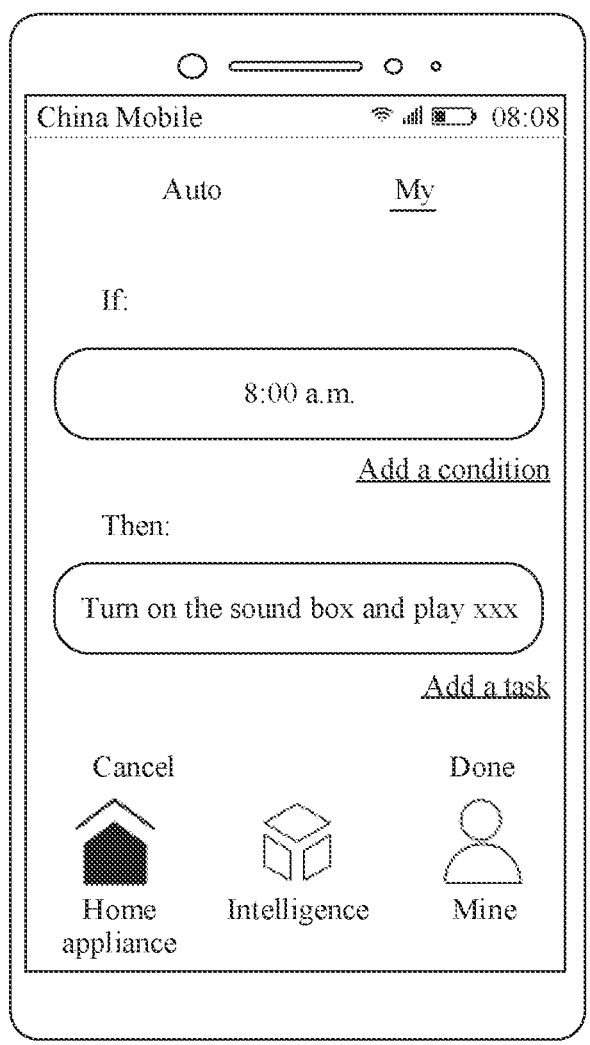

For example, the second device sends the control policy (including the control condition and the control manner) set in FIG. 4D to the cloud.

S425: The cloud controls the first device according to the control policy.

The control policy shown in FIG. 4D is still used as an example. The cloud determines that a current time is 8 a.m., and sends an instruction to the first device (for example, a sound box), to control the first device to be turned on and play the song "xxx".

In other words, after setting the control policy for the first device, the second device controls the first device by using the cloud according to the control policy. Therefore, when the second device is far away from the first device, for example, the second device is a mobile phone, the user carries the mobile phone in an office, and the first device is a sound box placed at home of the user, the first device may also be controlled by using the cloud.

In conclusion, that the second device becomes the owner of the first device means that: The cloud records that the owner (owner) of the first device is the second device, and therefore the cloud controls the first device according to the control policy that is set by the owner (that is, the second device) and that is for the first device. This is a permanent control right.

Embodiment 2

Embodiment 2 describes a process in which a third device obtains a temporary control right over a first device. Different from a permanent control right, the temporary control right may be obtained based on an ultra-short-distance communication technology without passing through a cloud, and belongs to ultra-short-distance point-to-point communication between the third device and the first device.

A possible scenario of Embodiment 2 is that an owner of the first device is a second device. Optionally, the first device supports an open mode, and the owner may enable or disable the open (open) mode of the first device. When the first device enables the open mode, an ultra-short-distance communication function is enabled, and the third device may obtain the temporary control right over the first device based on the ultra-short-distance communication function. When the first device disables the open mode, the third device cannot obtain the temporary control right over the first device. Definitely, in addition to the foregoing scenario, Embodiment 2 is also applicable to other scenarios. For example, the first device is not configured with an owner. In this case, the first device may also enter the open mode. For example, a button for enabling or disabling a development mode is set on the first device, and the open mode is enabled or disabled by using the button, so that another device obtains a temporary control right over the first device. Embodiment 2 is mainly described by using a previous scenario as an example. Specifically, Embodiment 2 relates to FIG. 5A to FIG. 5D.

Figure 5A:
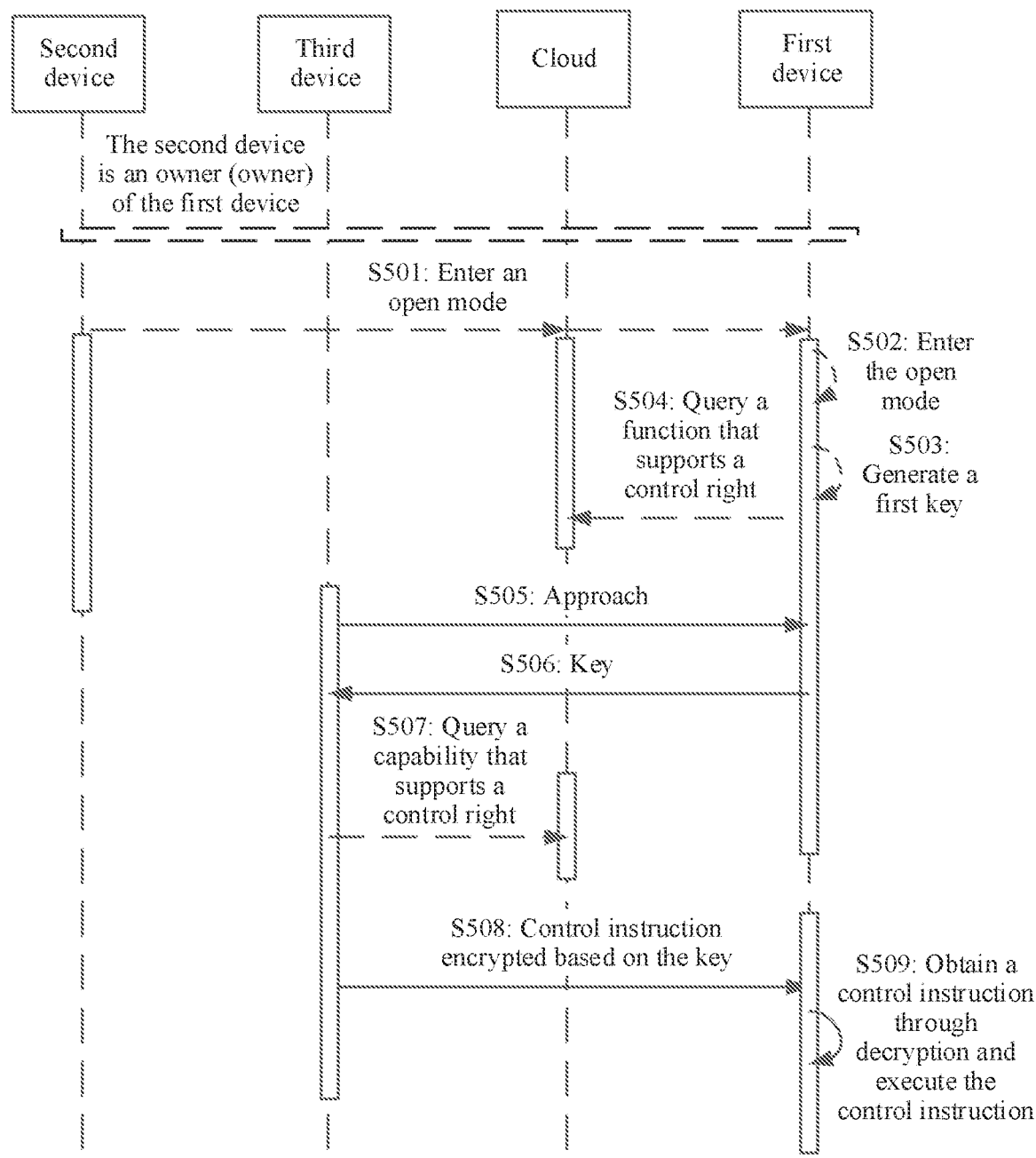
FIG. 5A is a schematic flowchart of a device control right obtaining method according to an embodiment of this application.

FIG. 5A is a schematic flowchart in which the third device obtains the temporary control right over the first device according to Embodiment 2 of this application. The procedure shown in FIG. 5A is described by using an example in which the owner of the first device is the second device. Therefore, "The second device is an owner of the first device" is marked in FIG. 5A. However, because Embodiment 2 is applicable to a case in which the first device is configured with or not configured with the owner, "the second device is an owner of the first device" in the figure is marked by using a dashed line. As shown in FIG. 5A, this procedure includes the following steps.

S501: The second device controls the first device to be in the open (open) mode.

Figure 5B:
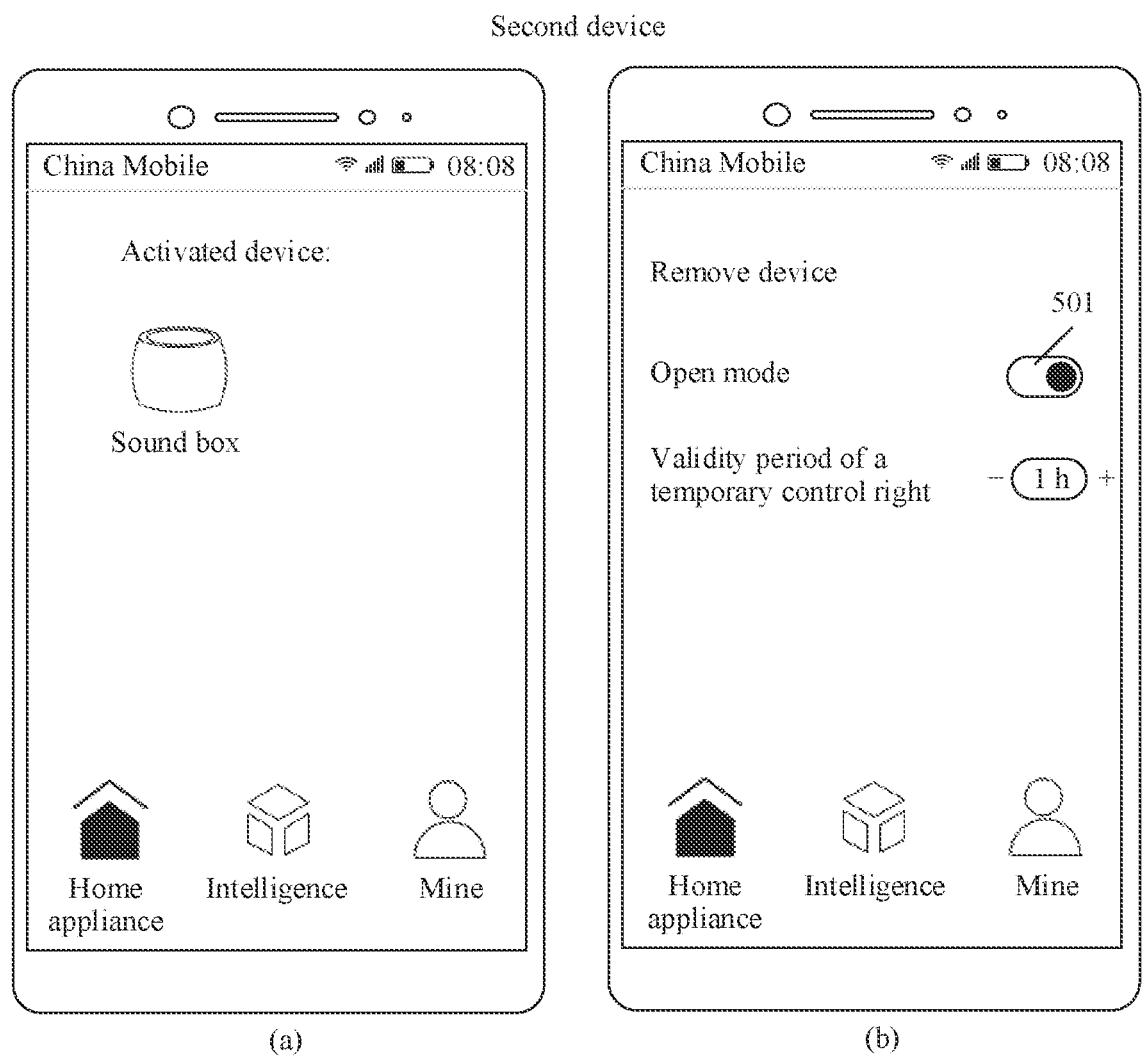
FIG. 5B is a schematic diagram of GUIs of a second device according to an embodiment of this application.
Figure 5C:
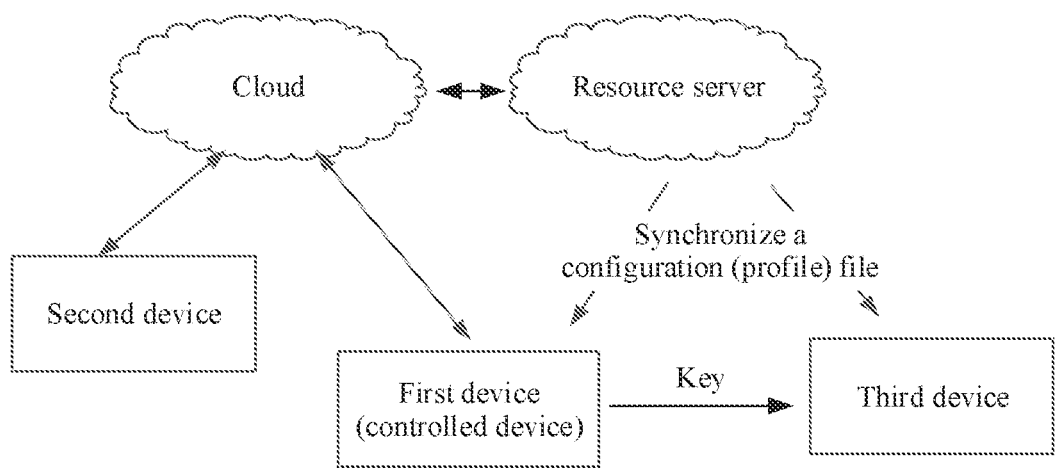
FIG. 5C is a schematic diagram of another communication system according to an embodiment of this application.
Figure 5D:
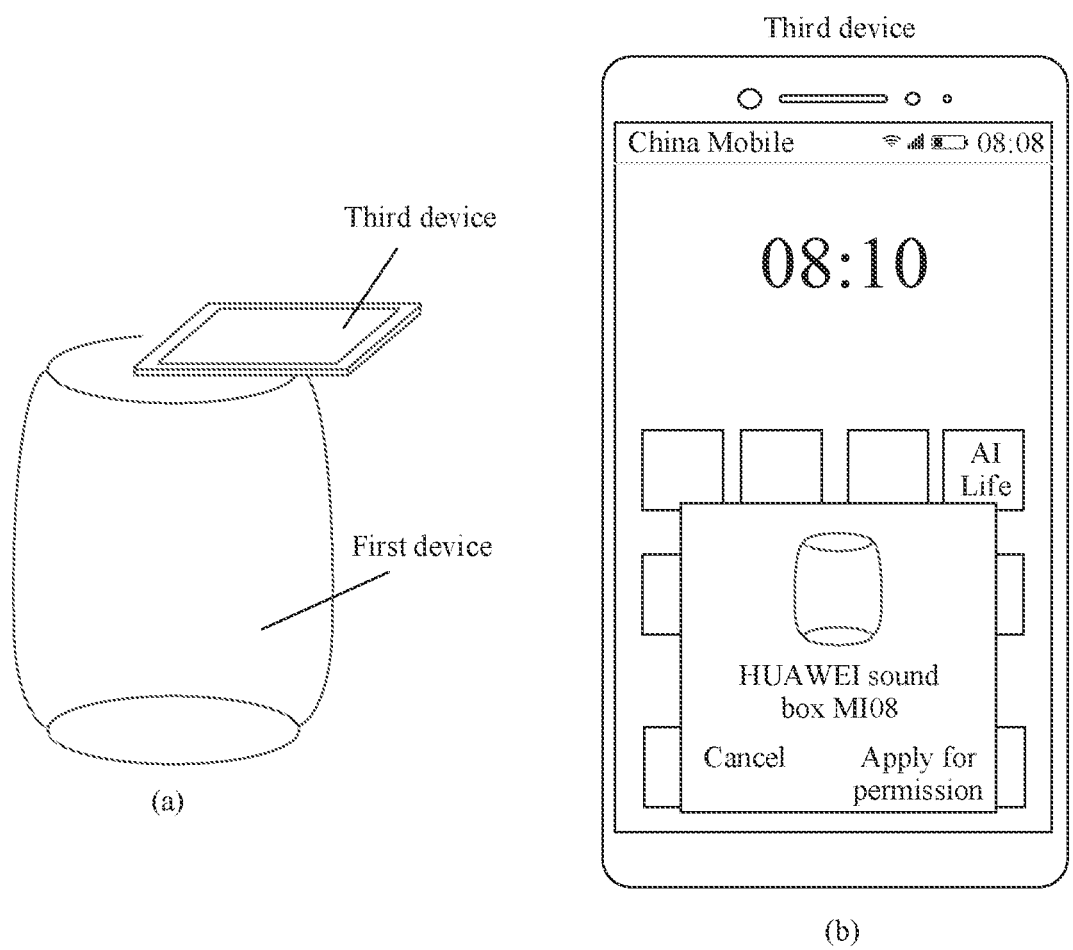
FIG. 5D is a schematic diagram in which a third device approaches a first device according to an embodiment of this application.

Manner 1: The second device (that is, the owner of the first device) may control, by using the cloud, the first device to be in the open mode. For example, the second device sends a first instruction to the cloud, where the first instruction instructs the cloud to send, to the first device, a second instruction that instructs the second device to enter the open mode. For example, the second device displays an interface shown in (a) in FIG. 5B, and a sound box identifier is displayed in the interface. When the second device detects an operation for the sound box identifier, an interface shown in (b) in FIG. 5B is displayed, where the interface includes an option of the open mode and a button 501 for turning on or off the option. When detecting an activation operation for the button 501, the second device sends the first instruction to the cloud, so that the cloud sends the second instruction to the first device.

Manner 2: The first device may alternatively automatically enter the open mode without control performed by the second device. For example, the first device automatically enters the open mode after being powered on, or enters the open mode after being triggered by a user. For example, a button for controlling the first device to enter the open mode is set on the first device, and the first device is controlled to enter the open mode by using the button. Alternatively, receiving a voice instruction that instructs the first device to enter the open mode, the first device automatically enters the open mode. In this case, S501 may not be performed, and therefore, S501 is represented by a dashed line in the figure.

For example, when the owner of the first device is the second device, the foregoing manner 1 or manner 2 may be used. When no owner is configured for the first device, the manner 2 may be used.

S502: The first device enters the open mode.

In the open mode, the first device may enable the ultra-short distance communication function, for example, a Wi-Fi Aware function or an NFC function.

Optionally, S501 and S502 may not be performed. For example, no open mode is configured in the first device. After the first device is powered on (for example, the first device is powered on for the first time after delivery), the first device may automatically enter step S503 without manual setting by the user.

S503: The first device generates a key.

There may be a plurality of types of keys, such as a symmetric key and an asymmetric key.

1. Symmetric encryption (Symmetric Cryptography) key, also referred to as private key encryption, means that a transmitter and a receiver encrypt and decrypt information by using one key. In other words, the first device and the third device use a same key.

2. Asymmetric encryption (Asymmetric Cryptography) keys are a combination of a public key and a private key. When a transmitter encrypts a message by using a public key, a receiver may perform decryption by using a paired private key. Alternatively, when a transmitter encrypts a message by using a private key, a receiver may perform decryption by using a paired public key.

Optionally, S503 may not be performed, and therefore is represented by using a dashed line in the figure. For example, the key is configured by default when the first device is delivered from a factory, or may be set by a user and does not need to be generated by the first device.

Optionally, to ensure security, the key has a validity period. The key takes effect within the validity period, and the key becomes invalid after the validity period expires. There are a plurality of manners for setting the validity period of the key. For example, the validity period of the key is determined based on a type of the first device. A manner of determining the validity period of the key based on the type of the first device may be executed by the second device, or may be executed by the cloud, or may be executed by the first device. That the manner of determining the validity period of the key based on the type of the first device is executed by the second device is used as an example, before the second device S501, the second device determines the type of the first device, determines the validity period of the key of the first device based on the type of the first device, and then sends the validity period to the first device. For example, the type includes, for example, an entertainment type, an office type, a cleaning type, a sleep optimization type, and a smart wakeup type. The entertainment type includes, for example, a television and a game console. The office type includes, for example, a printer, a copier, a fax machine, and a projector. The cleaning type includes, for example, a floor-scanning robot and an air purifier. The sleep optimization type includes, for example, a table lamp, a socket, and a humidifier. The smart wake-up type includes, for example, a curtain, a sound box, and an alarm clock. For example, a validity period of a key of a device of the entertainment type is less than a first threshold, a validity period of a key of the device of the office type is less than a second threshold, and the first threshold is less than the second threshold, to avoid unlimited control of the device of the entertainment type. For another example, a validity period of a device of the sleep optimization type is less than a third threshold, and the third threshold is greater than the first threshold. For example, a key of a table lamp is greater than a key of a television set, to prevent the user from frequently obtaining the key of the desk lamp to control the desk lamp.

Alternatively, the validity period of the key of the first device may be set by default or set by the user. That the validity period of the key of the first device is set by the user as an example. The user may set the validity period of the key of the first device on the first device and the second device. If the user is on the second device, the second device sends the set validity period to the first device by using the cloud.

S504: The first device queries a function of the first device that supports the temporary control right.

For example, the first device is a sound box, and capabilities of the first device includes not only functions of playing, pausing, stopping, and switching a song, but also functions of deleting and downloading a song; and may further include naming the sound box, setting a power-on password (or a voice wakeup instruction), and the like. Generally, deleting a song, naming the sound box, and setting a power-on password are user privacy, and these functions may not support the temporary control right. Therefore, the first device may query, from the cloud, which function on the first device supports the temporary control right and which function does not support the temporary control right. For example, the cloud stores a configuration (profile) file corresponding to various types of devices, and the profile file is used to describe a function of a device of the corresponding type that supports the temporary control right. For example, the first device sends a query instruction to the cloud, where the query instruction includes a device type of the first device (for example, a Huawei sound box MI08). After receiving the query instruction, the cloud determines, based on the device type of the first device, a profile file corresponding to the device type, and then sends the profile file to the first device. The first device may determine, based on the profile file, which function supports the temporary control right.

For example, an example in which the first device is a sound box is still used. It is determined, based on a profile file corresponding to the sound box, that functions of deleting a song, naming a song, and setting a power-on password in the sound box do not support the temporary control right. In this case, after the third device obtains the temporary control right over the sound box, the third device cannot delete the song in the sound box, and cannot set the power-on password of the sound box.

It should be noted that, the first device may query, on the cloud, the function in the first device that supports the temporary control right, or may query another device. For example, refer to FIG. 5C. The cloud is connected to a resource server, and the resource server stores profile files corresponding to various types of devices. The first device may directly query the resource server for the profile file corresponding to the device type of the first device. Alternatively, the first device still sends a query request to the cloud, and then the cloud queries the resource server, and sends a result obtained by querying from the resource server to the first device.

Optionally, S504 may be performed or not performed. For example, a case in which S504 is not performed includes: The first device locally stores the profile file, and may determine, based on the locally stored profile file, which function support the temporary control right without querying the cloud. Alternatively, the function that supports the temporary control right over the first device is set before the first device is delivered from a factory, or a user specifies which function supports the temporary control right without determining based on a profile file; or all functions of the first device support the temporary control right by default without querying.

S505: The first device detects that the third device approaches the first device.

For example, that the third device approaches the first device may be that an NFC area on the third device approaches an NFC area on the first device. When detecting an NFC signal from the third device, the first device determines that the third device approaches. For example, refer to (a) in FIG. 5D. The third device is, for example, a mobile phone, and the user uses the mobile phone to approach the first device (for example, the sound box). Alternatively, the third device enables Wi-Fi Aware, and the first device enables Wi-Fi Aware. When detecting a Wi-Fi Aware signal of the third device, the first device determines that the third device approaches. Certainly, in addition to Wi-Fi Aware and NFC, a Bluetooth technology may alternatively be used. This is not limited in this embodiment of this application.

S506. The first device sends the key to the third device.

Optionally, when detecting that the third device approaches, the first device may automatically send the key to the third device. Alternatively, when the third device approaches the first device, the third device may pop up prompt information, where the prompt information is used to prompt the user whether to apply for a control right over the first device. For example, refer to (b) in FIG. 5D. The third device displays an identifier of the first device (for example, the sound box) and a button for "apply for permission". If a tap operation of the user on the "apply for permission" button is detected, the third device sends an application to the first device. After receiving the application, the first device sends the key to the third device. Certainly, in order to help the user to distinguish whether a requested control right is a temporary control right or a permanent control right, the "apply for permission" button in (b) in FIG. 5D may be replaced with an "apply for a temporary control right" button.

Alternatively, before sending the key to the third device, the first device may further determine a distance between the third device and the first device, and if the distance is less than a preset distance, send the key to the third device. There are a plurality of manners for determining the distance between the third device and the first device, for example, laser ranging. Alternatively, an example in which Wi-Fi Aware is enabled on the third device and Wi-Fi Aware is enabled on the first device is used. When detecting that signal strength of Wi-Fi Aware of the third device is greater than a preset value, the first device determines that the distance between the third device and the first device is less than the preset distance. The first device sends the key to the third device when determining that the distance between the third device and the first device is less than the preset distance. For example, the preset distance may be any value in a range of 0 cm to 30 cm, for example, 1 cm, 2 cm, 3 cm, 4 cm, or 5 cm. If the preset distance is set to a relatively small value, a misconnection can be avoided. For example, a case in which the third device is carried by the user and passes by the first device, resulting in that the third device obtains the key of the first device by mistake is avoided.

Alternatively, before sending the key to the third device, the first device may further determine whether signal strength of the third device is greater than a threshold. The threshold is, for example, any value in a range from −5 dBm to −150 dBm, for example, −10 dbm, −15 dbm, −20 dbm, −25 dbm, −30 dbm, −35 dbmn, −40 dbm, −45 dbm, −50 dbm, −60 dbm and −70 dBm. For example, Wi-Fi Aware is enabled on the third device, and Wi-Fi Aware is enabled on the first device. When detecting that signal strength of Wi-Fi Aware of the third device is greater than a preset value, the first device sends the key to the third device.

If the first device uses a symmetric key, the first device sends the symmetric key to the third device, to ensure key consistency between the third device and the first device. If the first device uses an asymmetric key (that is, includes a public key and a private key), the first device may use the public key, and send the private key corresponding to the public key to the third device. Alternatively, the first device uses the private key, and sends the public key corresponding to the private key to the third device. Because a communication distance between the third device and the first device is short, a probability that a key is intercepted is low, and security is high.

Optionally, a sequence of S502 to S506 is not limited. For example, S503 may be performed after S505, that is, the first device generates the key when detecting that the third device approaches. Alternatively, S504 may be performed before S502, that is, the first device queries in advance the function that supports the temporary control right.

Optionally, the key may be sent in plaintext. Because the first device sends the key by using the ultra-short distance communication technology, the communication distance is short, the probability that the key is intercepted is low, and the security is high. Certainly, to improve security, the key may alternatively be sent in ciphertext, that is, the key is encrypted, and then the encrypted key is sent. This is not limited in this application. It may be understood that, if the key is encrypted and sent, a decryption manner may be preset. For example, a decryption manner is preconfigured in the third device. When receiving the encrypted key, the third device may perform decryption in the preconfigured decryption manner to obtain the key.

S507: The third device queries a capability of the first device that supports the temporary control right.

Step S507 is an optional step, and may be performed or may not be performed. For example, a case in which S507 is not performed may include: By default, all functions of the first device support the temporary control right; or in S506, the first device sends the profile file and the key to the third device together, and the third device does not need to obtain, from the cloud, the profile file corresponding to the first device.

S508: The third device sends a control instruction to the first device, where the control instruction is obtained through encryption based on the key sent by the first device.

For example, the first device is a sound box, and the control instruction may be "power-on", "power-off", "switch to a next song", "play a song XXX", and the like.

S509: The first device obtains the control instruction through decryption and executes the control instruction.

If the key sent by the first device is the symmetric key, the third device encrypts the control instruction by using the key. When receiving the encrypted control instruction, the first device decrypts the control instruction by using the same key. If the key sent by the first device is the public key in the asymmetric key, that is, the third device encrypts the control instruction by using the public key, when receiving the encrypted control instruction, the first device performs decryption by using the private key corresponding to the public key. If the key sent by the first device is the private key in the asymmetric key, that is, the third device encrypts the control instruction by using the private key, when receiving the encrypted control instruction, the first device performs decryption by using the public key corresponding to the private key.

It can be learned from S505, S506, S508, and S509 that the third device controls the first device based on the ultra-short range communication technology. Therefore, the owner of the first device recorded on the cloud side is still the second device (refer to Table 3).

Optionally, after the third device obtains the temporary control right over the first device, the first device may further send prompt information to the owner (that is, the second device) of the first device. For example, the prompt information is that the third device obtains the temporary control right over your Huawei sound box MI08.

In this application, the temporary control right has a validity period, takes effect within the validity period, and is invalid after the validity period expires.

For example, the validity period of the temporary control right may be set in one or more of the following manners.

Manner 1: The validity period of the temporary control right is related to the validity period of the key of the first device. If the key is effective, the temporary control right is effective; if the key is invalid, the temporary control right is invalid. For example, after entering the open mode, the first device immediately generates the key, and sends the key to the third device when detecting that the third device approaches. It is assumed that the first device generates the key at a moment t1, detects that the third device approaches at a moment t1+20 min, and sends the key to the third device. The validity period of the key is 60 min. Therefore, at a moment t1+60 min (that is, after 40 min), the key is automatically invalid, and correspondingly, the temporary control right is invalid. Correspondingly, the validity period of the temporary control right may be less than the validity period of the key. Alternatively, the first device generates the key when detecting that the third device approaches and sends the key to the third device. In this case, the validity period of the key and the validity period of the temporary control right are almost the same. A manner for setting the validity period of the key of the first device has been described above, and details are not described herein again.

Certainly, after the third device obtains the temporary control right over the first device, before the key of the first device is about to be invalid, the first device may also generate a new key, and then send the new key to the third device, so that the third device temporarily controls the first device based on the new key This is not limited in this embodiment of this application.

Manner 2: The validity period of the temporary control right over the first device is determined based on the type of the first device. For example, when the third device approaches the first device, the first device may send the type of the first device to the third device, and the third device determines the validity period of the temporary control right over the first device based on the type of the first device. Alternatively, FIG. 5A is still used as an example. In S501, before, after, or at the same time when the second device controls the first device to enter the open mode, the second device may obtain the type of the first device, determine the validity period of the temporary control right over the first device based on the type of the first device, and then send the determined validity period to the first device by using the cloud. A description of the type of the first device has been described above, and is not repeated herein.

Manner 2 and Manner 1 are different. For example, the temporary control right over the first device determined in Manner 2 is 2 h, but the validity period of the key of the first device is 60 min. Therefore, when the first device updates the key within 2 h, the updated key needs to be sent to the third device, so that the third device controls the first device based on the updated key until 2 h are reached Manner 3: The validity period of the temporary control right over the first device is set by the user. Manner 3 may be performing setting on the third device, performing setting on the second device, or performing setting on the first device. Performing setting on the second device is used as an example. Refer to (b) in FIG. 5B. The second device displays a setting option of the validity period of the temporary control right over the first device (for example, the sound box). The user may set the validity period of the temporary control right over the first device by using the setting option, and the second device sends the set validity period to the first device by using the cloud. An implementation principle of setting the validity period of the temporary control right over the first device on the third device and an implementation principle of setting the validity period of the temporary control right over the first device on the second device are the same, and details are not described again. If the setting is performed on the first device, for example, the first device includes a button for setting the validity period of the temporary control right over the first device, the user sets the validity period of the temporary control right over the first device based on the button.

Manner 4: The temporary control right over the first device is set by default when the first device is delivered from a factory.

Manner 5: The user may manually stop the temporary control right over the first device. Manner 5 may be performed on the third device, or may be performed on the owner (that is, the second device) of the third device, or may be performed on the first device. For example, a button used to stop the temporary control right over the first device is set on the third device, the second device, or the first device, and the user stops the temporary control right over the first device by using the button. For example, refer to (b) in FIG. 5B. When detecting an operation of turning off the button 501, the second device sends an instruction for stopping the temporary control right over the first device to the cloud, the cloud sends the instruction to the first device, and the first device stops receiving control from the third device.

Manner 6: If the first device detects that a fourth device approaches, the fourth device sends a new key (different from the key sent to the third device), so that the fourth device obtains the temporary control right over the first device based on the new key, and the temporary control right over the first device of the third device is automatically invalid. Briefly, the temporary control right obtained by the third device over the first device is invalid for being covered by the temporary control right obtained by the fourth device over the first device.

Certainly, the third device and the fourth device may also have the temporary control right over the first device at the same time. For example, when the third device and the fourth device obtain the temporary control right over the first device in sequence, the temporary control right obtained by the third device is not covered by the temporary control right obtained by the fourth device, but coexists with the temporary control right obtained by the fourth device. In this way, both the third device and the fourth device may temporarily control the first device. For example, the first device may determine, based on the type of the first device, whether the temporary control right over the third device and the temporary control right over the fourth device can coexist. For example, if the first device is a device of a sleep optimization type (for example, the table lamp), the temporary control right of the third device and the temporary control right of the fourth device may coexist, that is, both the third device and the fourth device have the temporary control right over the table lamp. For another example, the first device is an office device (for example, the projector), and temporary control rights of the third device and the fourth device cannot coexist. That is, before the temporary control right over the projector obtained by the third device is invalid, if the fourth device obtains the temporary control right over the projector, the temporary control right of the third device is automatically invalid.

Optionally, in Embodiment 1, it is described that the first device may be connected to the cloud and receive control from the cloud, and in Embodiment 2, it is described that the first device may receive temporary control from the second device. If a module in the first device that is configured to connect to the cloud is referred to as a first module (for example, a Wi-Fi module), and a module in the first device that is configured to connect to the third device is referred to as a second module (for example, an NFC module), before the first device enters the open mode, the second module may be in an off state, after the first device enters the open mode, the second module is in an on state. Optionally, when the second module is on, the first module may be off or may be not off. If both the second module and the first module are on, that is, the first device may receive temporary control of the third device based on the ultra-short-distance communication function, or may receive control of the owner. Alternatively, after entering the open mode, the first device may periodically switch the first module and the second module. For example, in a period in which the first module is on, the second module is off. In this period, the first device may receive temporary control of the third device based on the ultra-short-distance communication function, and cannot receive control from the cloud. When on duration of the first module reaches set duration, the first module is automatically off, and the second module is on. In this case, the first device cannot receive temporary control of the third device, but can receive control from the cloud. On periods of the first module and the second module may be the same or different, may be set by default, or may be set by a user.

In conclusion, in Embodiment 2, the third device may obtain the temporary control right over the first device to implement temporary control on the first device.

Embodiment 3

In Embodiment 2, when the third device obtains the temporary control right over the first device, confirmation of the owner (that is, the second device) of the first device is not required. A difference between Embodiment 3 and Embodiment 2 lies in that: in Embodiment 3, before obtaining the temporary control right over the first device, a third device needs to be confirmed by an owner (that is, a second device) of a first device, and may obtain a temporary control right over the first device after being confirmed by the owner. Specifically, Embodiment 3 includes FIG. 6A and FIG. 6B.

Figure 6A:
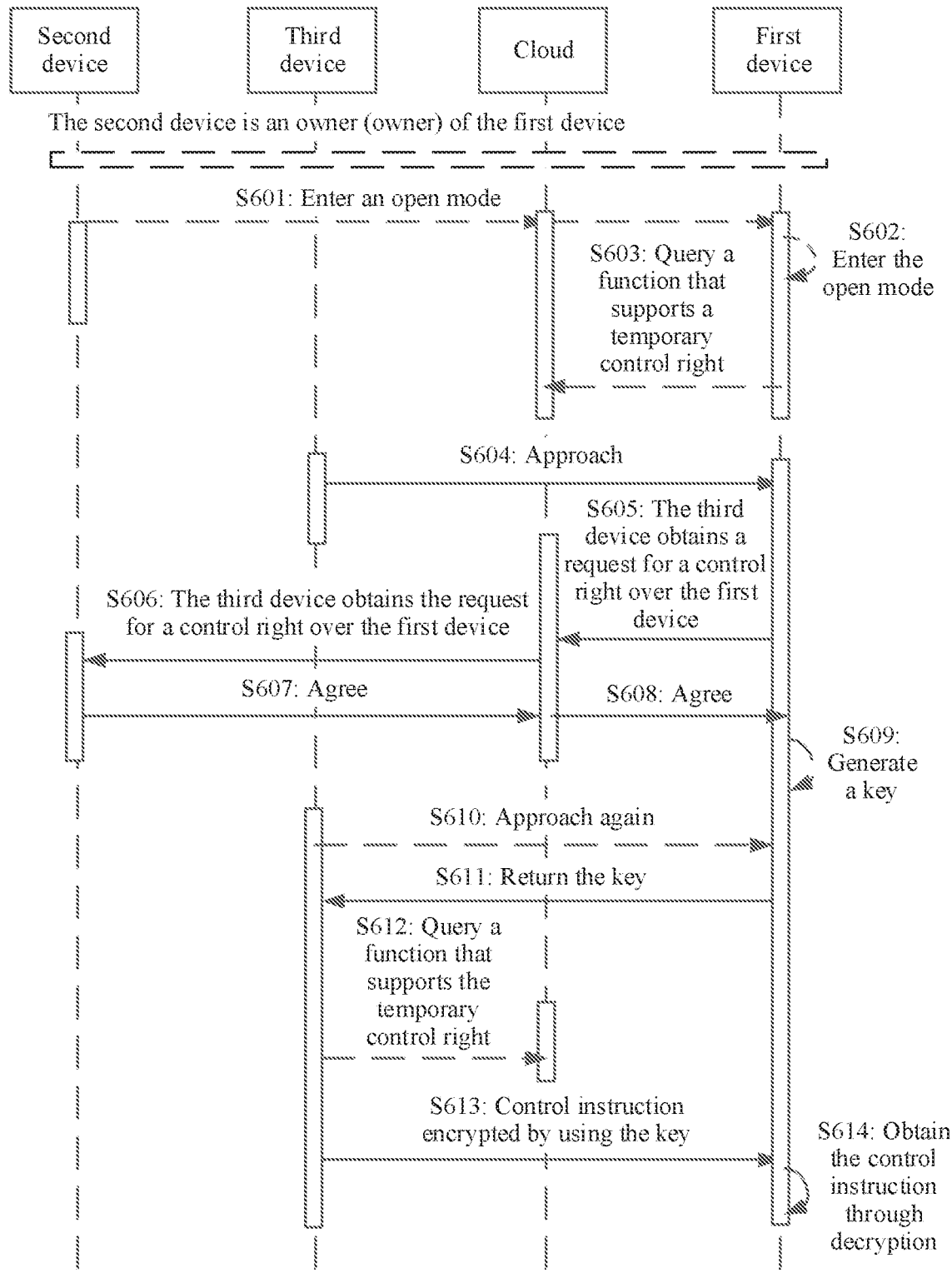
FIG. 6A is another schematic flowchart of a device control right obtaining method according to an embodiment of this application.

FIG. 6A is a schematic flowchart in which the third device obtains the temporary control right over the first device according to Embodiment 3 of this application. As shown in FIG. 6A, this procedure includes the following steps.

S601: The second device controls the first device to be in an open mode.

S602: The first device enters the open mode.

Optionally, S601 and S602 may be performed or not performed. A principle is the same as a principle of S501 and S502 in Embodiment 2, and details are not described again.

S603: The first device queries a function of the first device that supports the temporary control right.

Optionally, S603 may be performed or may not be performed. A principle is the same as a principle of S504 in Embodiment 2, and details are not described again.

S604: The first device detects that the third device approaches the first device.

For an implementation principle of S604, refer to S505 in Embodiment 2. Details are not described again.

In Embodiment 2, when detecting that the third device approaches, the first device sends the key to the first device. Different from Embodiment 2, in Embodiment 3, when detecting that the third device approaches, the first device requests the owner of the first device for confirmation, and sends a key to the third device under confirmation of the owner. Specifically, steps S605 to S614 are performed for implementation.

S605: The first device sends a request to a cloud, where the request indicates the third device to request the temporary control right over the first device.

Optionally, the request may carry a device identifier of the first device. Because the cloud stores the first device and the owner of the first device (for example, Table 3), the cloud may determine the owner of the first device (that is, the second device) based on the device identifier of the first device, and the cloud sends the request to the owner, that is, S606.

S606: The cloud sends the request to the second device.

S607: The second device sends a consent instruction to the cloud.

Figure 6B:
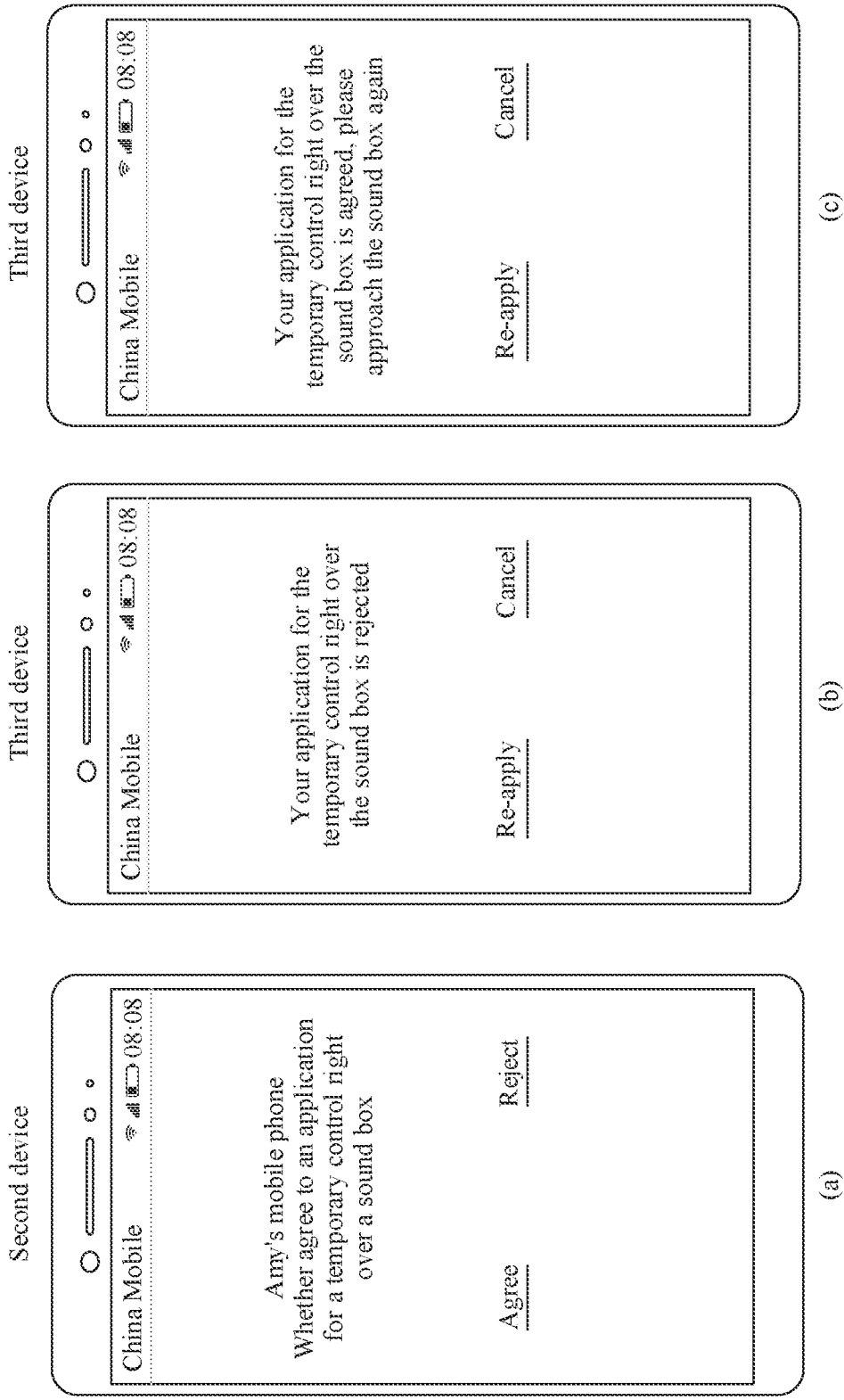
FIG. 6B is a schematic diagram of GUIs of a second device and a third device according to an embodiment of this application.

Optionally, before S607, the second device may display prompt information, for example, prompt information shown in (a) in FIG. 6B: A mobile phone of Amy (that is, identifier information of the third device) applies for the temporary control right over a sound box, and whether agree: and two buttons, namely, "agree" and "reject", are further displayed. If the second device detects a tap operation on the agree button, the second device sends the consent instruction to the cloud, that is, S608. If the second device detects a tap operation on the reject button, the second device sends a reject instruction to the cloud, and the cloud may send the reject instruction to the first device, and then the first device forwards the reject instruction to the third device. A user of the third device knows that the application for the temporary control right over the first device is rejected. For example, refer to (b) in FIG. 6B. The third device displays prompt information: The temporary control right over the sound box that you apply for is rejected. The user of the third device may apply for the temporary control right over the first device again by using a re-apply button, or may abandon the temporary control right over the first device by using a "cancel" button.

S608: The cloud sends the consent instruction to the first device.

S609: The first device generates the key. For an implementation principle of the key, refer to the description in Embodiment 2. S609 may not be performed. For a principle, refer to Embodiment 2.

S610: The first device detects that the third device approaches the first device again.

S610 is an optional step, and may be performed or may not be performed. If S610 is not performed, that is, the third device needs to approach the first device only once to obtain the key of the first device. If S610 is performed, the third device needs to approach the first device twice, where the first approach is to apply to the owner of the first device for the temporary control right over the first device, and after the owner agrees, the second approach is performed to obtain the key of the first device. Optionally, to prompt the user to approach the speaker for the second time in time, when receiving the consent instruction, the first device may send prompt information to the third device, where the prompt information is used to prompt the user to approach the first device again. For example, refer to (c) in FIG. 6B. The third device displays prompt information: The temporary control right over the sound box (that is, the first device) that you applied for has been agreed, please approach the sound box again.

Alternatively, the first device may record a first time when the third device approaches last time, and further record a second time when the third device approaches again. If a time difference between the first time and the second time is less than a threshold, the first device sends the key to the third device, and does not need to request the owner for confirmation again. In this way, it can be avoided that the third device requests confirmation from the owner each time the third device approaches the first device.

S611: The first device sends the key to the third device.

S612: The third device queries a function of the first device that supports the temporary control right. S612 may be performed or not performed. For a principle, refer to S507 in Embodiment 2.

S613: The third device sends a control instruction to the first device, where the control instruction is encrypted by using the key.

S614: The first device obtains the control instruction through decryption and executes the control instruction.

For an implementation principle of S611 to S614, refer to Embodiment 2. Details are not described herein again.

In summary, in Embodiment 3, when the third device approaches the first device, the third device may obtain the temporary control right over the first device under authorization of the owner of the first device, to prevent the temporary control right of the first device from being obtained by any person, thereby improving security.

Figure 6C:
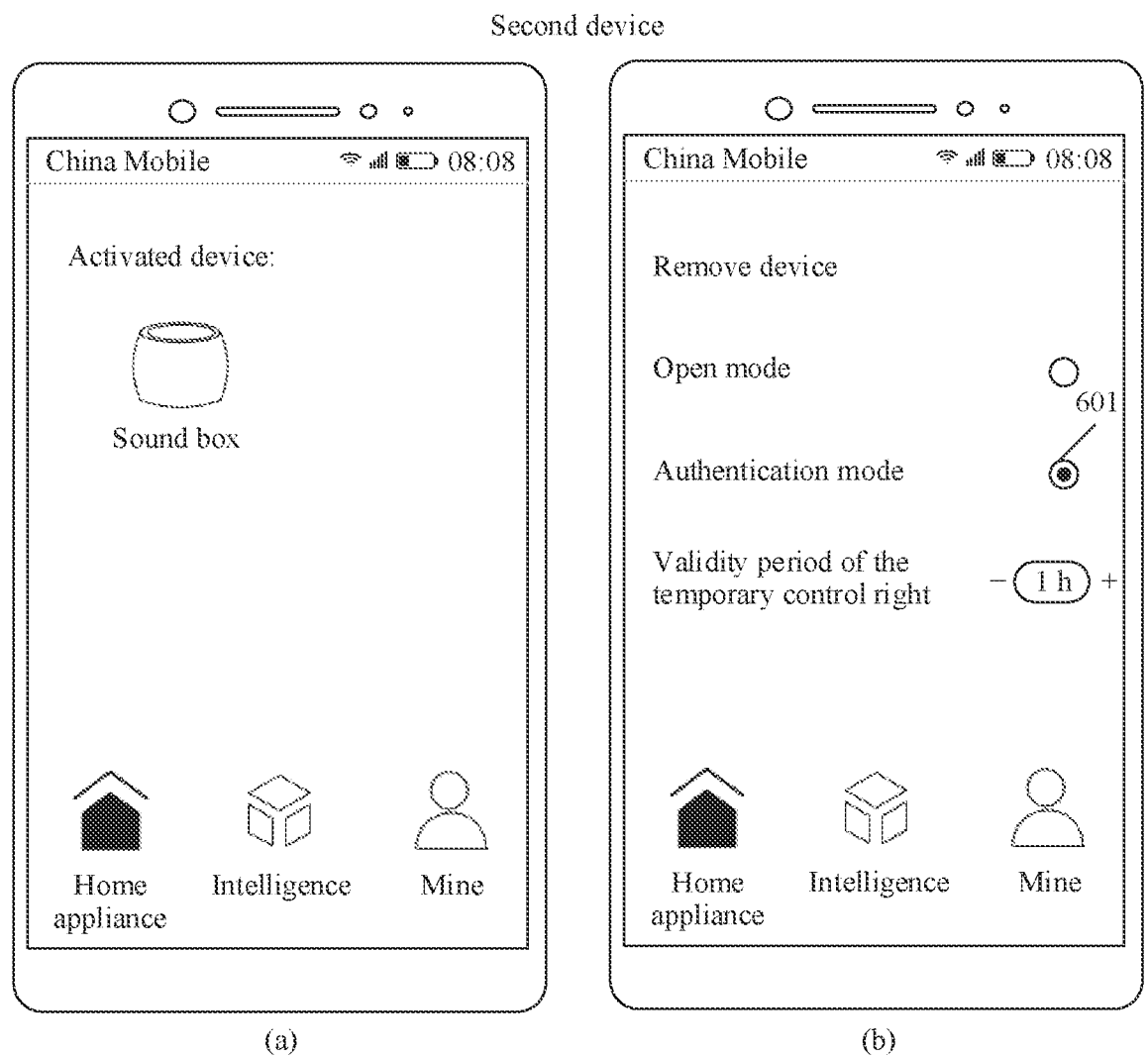
FIG. 6C is a schematic diagram of GUIs of a second device according to an embodiment of this application.

Optionally, if the manner of obtaining the temporary control right in Embodiment 2 (that is, the manner without requiring owner confirmation) is used as the first manner, and the manner of obtaining the temporary control right in Embodiment 3 (that is, the manner with requiring owner confirmation) is used as the second manner, the first device, the second device, or the third device may use the first manner or the second manner by default, or the third device, the second device, or the first device is provided with a switch button, and switching between the first manner and the second manner may be implemented by using the switch button. The second device is used as an example. Refer to (a) in FIG. 6C. An identifier of an activated device (for example, the sound box) is displayed. When an operation on the sound box identifier is detected, an interface shown in (b) in FIG. 6C is displayed, where the interface includes an open mode and an authentication mode. When a button of the open mode is selected, the first device is notified to use the first manner, and when a button of the authentication mode is selected, the first device is notified to use the second manner.

Optionally, in Embodiment 3, the temporary control right also has a validity period. The temporary control right takes effect within the validity period, and the temporary control right is invalid after the validity period expires. For a manner of setting the validity period, refer to Embodiment 2.

Considering that there is a case, for example, the validity period of the temporary control right is short, for example, 10 min, and if the first device needs to be continuously controlled for more than 10 min, the temporary control right over the first device needs to be obtained again. In this case, if the temporary control right over the first device needs to be obtained for a plurality of times within a specific period, the owner needs to perform confirmation for a plurality of times. To avoid frequent confirmation by the owner, after the third device obtains the temporary control right over the first device and within a preset duration, if the third device obtains the temporary control right over the first device again, confirmation of the owner may be not required, that is, the manner in Embodiment 2 is used. For example, it is assumed that the preset duration is 1 h, the mobile phone of the user obtains the temporary control right over the sound box at 10:00, and the validity period is 30 min. Before 11:00, if the mobile phone of the user approaches the sound box again to obtain the temporary control right over the sound box, confirmation of the owner may not be required.

Alternatively, to avoid frequent confirmation of the owner, after the third device obtains the temporary control right over the first device, the third device is allowed to obtain the temporary control right over the first device for a preset quantity of times without authentication. The authentication-free obtaining is performed in the manner in Embodiment 2, and does not need confirmation of the owner. For example, it is assumed that the preset quantity of times is 3, a mobile phone of a user obtains the temporary control right over the sound box at 10:00, and a validity period is 30 min. Afterward, the third device has three opportunities to obtain the temporary control right over the first device without authentication. When the third device obtains the temporary control right over the first device for a fourth time, confirmation of the owner is required.

Embodiment 4

Figure 7A:
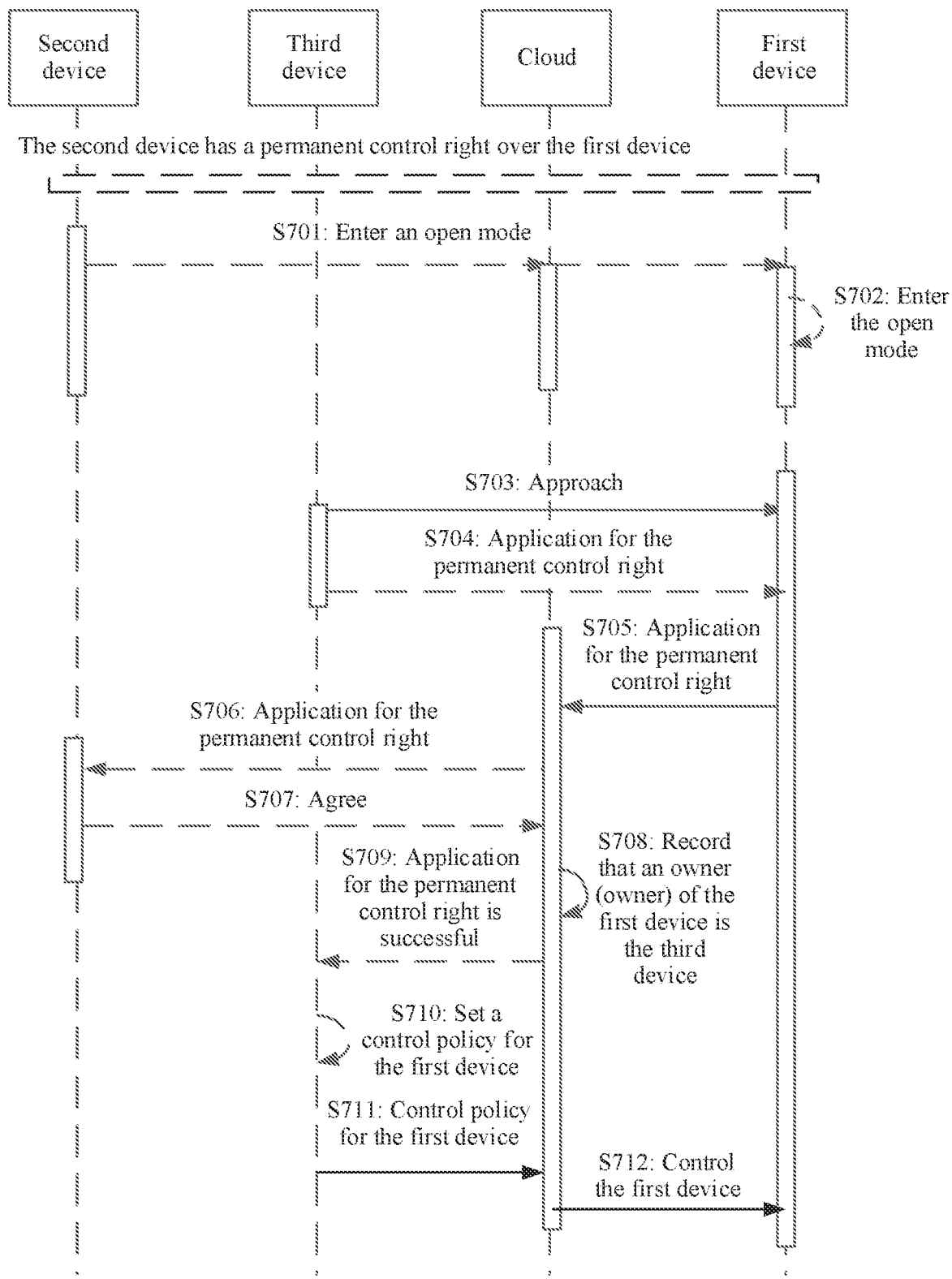
FIG. 7A is still another schematic flowchart of a device control right obtaining method according to an embodiment of this application.

In Embodiment 2 to Embodiment 3, the third device obtains the temporary control right over the first device. In Embodiment 4, a third device obtains a permanent control right over the first device, that is, the third device becomes an owner of the first device. Optionally, if no owner is configured for the first device, the third device may register as the owner of the first device on a cloud side in the manner in Embodiment 1. If an owner has been configured for the first device, and the owner is the second device, in this case, if there can be only one owner of the first device. the third device replaces the second device as the owner of the first device, or if there may be a plurality of owners of the first device, both the third device and the second device become owners of the first device. In Embodiment 4, an example in which the third device replaces the first device to become the owner of the first device is used. Specifically, accompanying drawings in this embodiment include FIG. 7A and FIG. 7B. FIG. 7A is a schematic flowchart in which the third device obtains the permanent control right over the first device according to Embodiment 4 of this application. This procedure is described by using an example in which the second device is the owner of the first device. Therefore, "the second device is an owner of the first device" is marked in FIG. 7A. As shown in FIG. 7A, this procedure includes the following steps.

S701: The second device controls the first device to enter an open mode.

S702: The first device enters the open mode.

Optionally, S701 and S702 may be performed or not performed. A principle is the same as a principle of S501 and S502 in Embodiment 2, and details are not described again.

S703: The first device detects that the third device approaches the first device.

For an implementation principle of S703, refer to S505 in Embodiment 2. Details are not described again.

In Embodiment 2, when detecting that the third device approaches, the first device sends the key to the first device, and the third device obtains the temporary control right over the first device based on the key. Different from Embodiment 2, in Embodiment 4, when detecting that the third device approaches, the first device may record on the cloud side that the owner of the first device is the third device, that is, the third device obtains the permanent control right over the first device. Specifically, steps S704 to S712 are performed for implementation.

S704: The third device sends an application for the permanent control right to the first device.

Figure 7B:
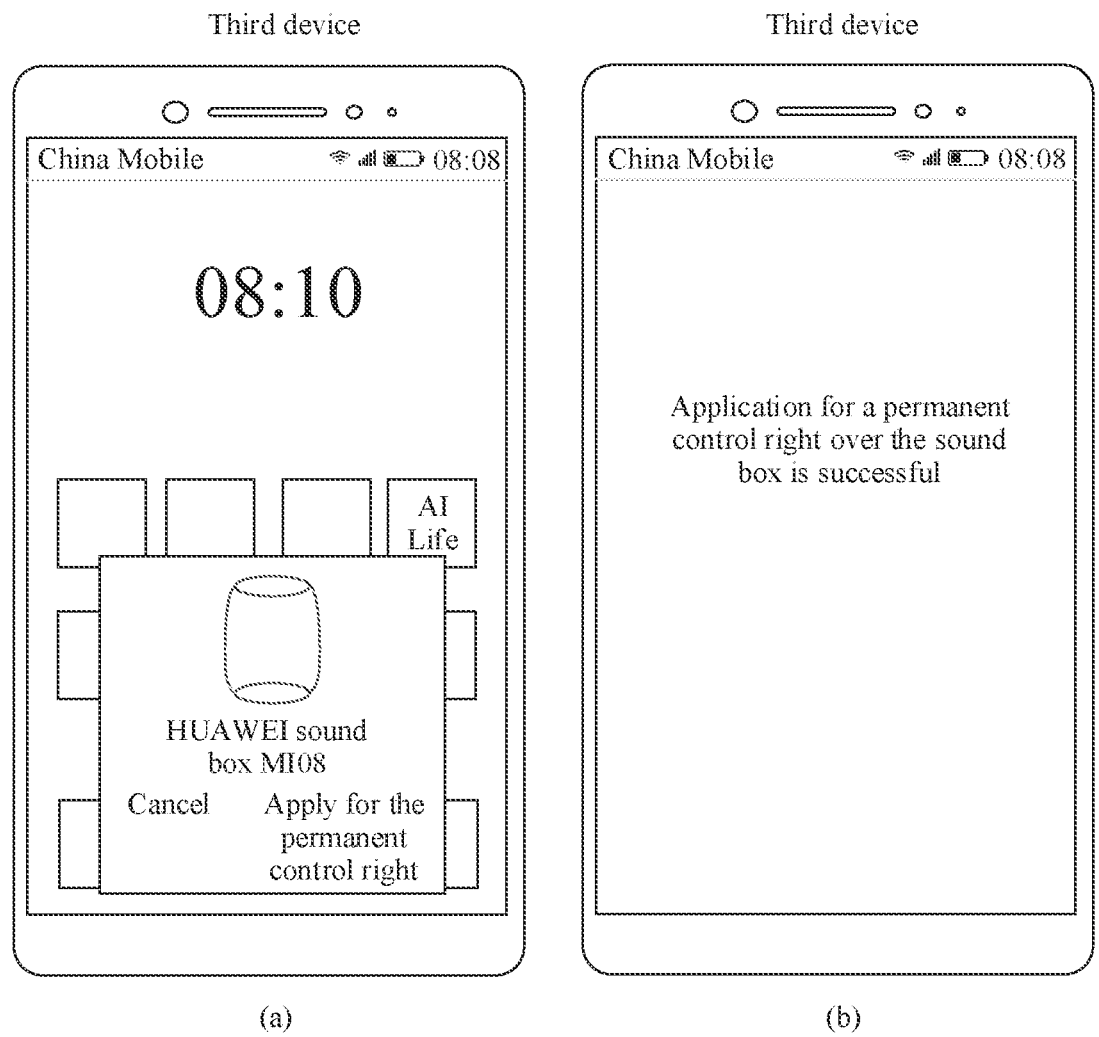
FIG. 7B to FIG. 7C are schematic diagrams of GUIs of a third device according to an embodiment of this application.

For example, refer to (a) in FIG. 7B. A display interface when the third device approaches the first device is (a) in FIG. 7B, and the interface includes a button of "apply for a permanent control right". In response to a tap operation on the button of "apply for a permanent control right", the third device sends the application for the permanent control right to the first device.

Optionally, S704 may be performed or may not be performed. For example, when detecting that the third device approaches, the first device automatically enters S705.

S705: The first device sends the application to the cloud.

S706: The cloud sends the application to the second device.

S707: The second device sends a consent instruction to the cloud.

Optionally, S706 and S707 are optional steps, and may be performed or may not be performed. If S706 and S707 are not performed, that is, the third device does not need to obtain the consent of the owner of the first device (that is, the second device) to obtain the permanent control right over the first device. If S706 and S707 are performed, that is, the third device needs to obtain the consent of the owner of the first device (that is, the second device) to obtain obtains the permanent control right over the first device. When the owner of the first device agrees, the third device obtains the permanent control right over the first device.

Optionally, if a first manner is that the permanent control right over the first device may be obtained only with the consent of the owner of the first device, and a second manner is that the permanent control right over the first device can be obtained without requiring the consent of the owner of the first device, the third device may use the first manner or the second manner by default. Alternatively, a switch button may be set on the second device or the first device, and the first manner or the second manner is set by using the switch button.

S708: The cloud records that the owner of the first device is the third device.

For example, before S708, if the owner of the first device is the second device, in S708, the cloud may update the owner of the first device from the second device to the third device. For example, Table 3 is updated to Table 4.

TABLE 4

| First device | Third device (an owner of the first device) |
|---|---|
| HUAWEI sound box AM08 | 185 0810 XXXX |

S709: The cloud sends, to the third device, indication information indicating that the application for the permanent control right is successful.

Optionally, S709 may be performed or may not be performed. For example, as shown in (b) in FIG. 7B, the third device displays prompt information: The permanent control right over the first device (that is, the sound box) is successfully applied for.

After the cloud side records that the owner of the first device is the third device, the third device may control the first device by using the cloud side. For example, the following steps are S710 to S712.

S710: Set a control policy for the first device on the third device.

Optional, S710 may be performed or not performed. For an implementation principle, refer to S423 in Embodiment 1.

S711: The third device sends the control policy for the first device to the cloud.

S712: The cloud controls the first device according to the control policy.

For an implementation principle of S711 and S712, refer to S424 and S425 in Embodiment 1.

Figure 7C:
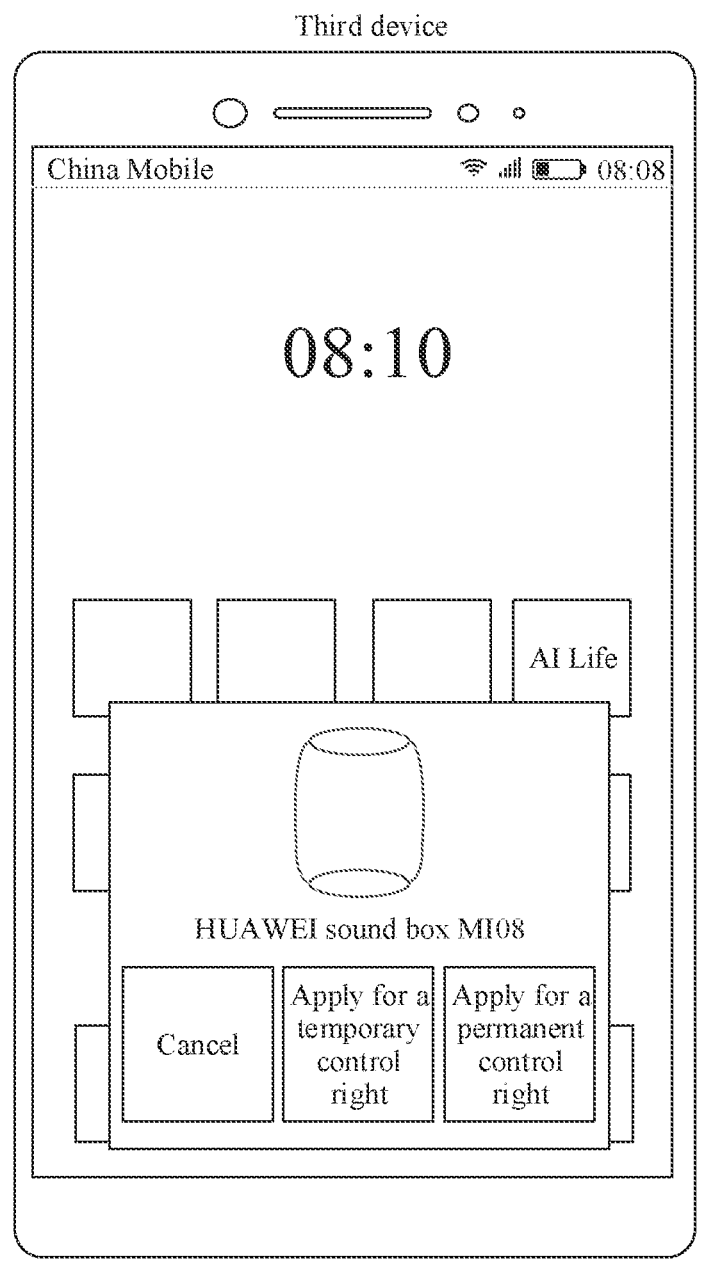

It should be noted that, in FIG. 7B, an example in which the third device displays only a button of "apply for a permanent control right" is used. It may be understood that, the third device may separately display a button of "apply for a permanent control right" and a button of "apply for a permanent control right". The user may select a corresponding button according to a requirement and tap the button to apply for a corresponding control right. For example, refer to FIG. 7C. If the temporary control right is applied for, the manner of Embodiment 2 or Embodiment 3 may be used for implementation. If the permanent control right is applied for, the manner of Embodiment 4 may be used for implementation.

The foregoing uses an example in which the third device directly applies for the permanent control right over the first device. It may be understood that, before applying for the permanent control right over the first device, the third device may further first determine whether the third device has the temporary control right over the first device. If the third device has the temporary control right over the first device, the third device may apply for the permanent control over the first device; otherwise, the third device cannot apply for the permanent control right over the first device.

Figure 8:
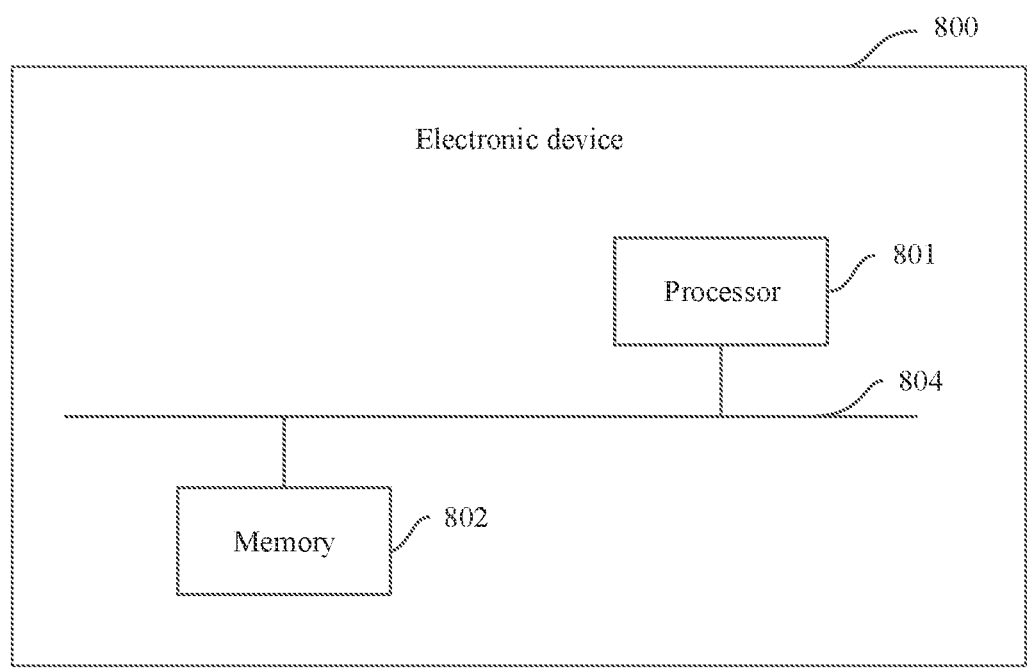
FIG. 8 is a schematic diagram of a structure of an electronic device according to an embodiment of this application.

Based on the foregoing embodiments, an embodiment of this application further provides an electronic device. The electronic device may be the foregoing first device, second device, third device, fourth device, or cloud. As shown in FIG. 8, the electronic device 800 may include one or more processors 801, a memory 802, and one or more computer programs (not shown in the figure). The foregoing components may be coupled by using one or more communication buses 804.

The memory 802 stores one or more computer programs, and the one or more computer programs include instructions. The processor 801 invokes the instructions stored in the memory 802, so that the electronic device 800 performs the device control right obtaining method provided in embodiments of this application.

In embodiments provided in this application, the method provided in embodiments of this application is described from a perspective of the electronic device as an execution body. To implement functions in the method provided in embodiments of this application, a terminal device may include a hardware structure and/or a software module, to implement the functions in a form of a hardware structure, a software module, or a combination of hardware structure and a software module. Whether a specific function in the foregoing functions is performed through the hardware structure, the software module, or the combination of the hardware structure and the software module depends on particular application and design constrain conditions of the technical solutions.

According to context, the term "when . . . " or "after . . . " used in the foregoing embodiments may be interpreted as a meaning of "if . . . ", "after . . . ", "in response to determining . . . ", or "in response to detecting . . . ". Similarly, according to the context, the phrase "when it is determined that . . . " or "if (a stated condition or event) is detected" may be interpreted as a meaning of "if it is determined that . . . ", "in response to determining . . . ", "when (a stated condition or event) is detected", or "in response to detecting (a stated condition or event)". In addition, in the foregoing embodiments, relationship terms such as first and second are used to distinguish one entity from another entity, but do not limit any actual relationship and sequence between these entities.

The foregoing embodiments may be entirely or partially implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or the functions according to embodiments of this invention are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The available medium may be a magnetic medium (for example, a floppy disk, a hard disk, or a magnetic tape), an optical medium (for example, a DVD), a semiconductor medium (for example, a solid state disk Solid State Disk (SSD)), or the like.

A person skilled in the art should be aware that in the foregoing one or more examples, functions described in embodiments of this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communications medium, where the communications medium includes any medium that enables a computer program to be transmitted from one place to another. The storage medium may be any available medium accessible to a general-purpose or a dedicated computer.

In the foregoing specific implementations, the objectives, technical solutions, and beneficial effect of embodiments of this application further described in detail. It should be understood that the foregoing descriptions are merely specific implementations of embodiments of this application, but are not intended to limit the protection scope of embodiments of this application. Any modification, equivalent replacement, improvement, or the like made based on the technical solutions of embodiments of this application shall fall within the protection scope of embodiments of this application. The foregoing descriptions in this specification of this application may enable technologies in the art to use or implement the content of embodiments of this application. Any modification based on the disclosed content should be considered definite in the art. The basic principles described in embodiments of this application may be applied to other variations without departing from the essence and scope of this application. Therefore, the content disclosed in embodiments of this application is not limited to the described embodiments and designs, but may also be extended to a maximum scope consistent with the principles and disclosed new features of this application.

Although this application is described with reference to specific features and embodiments thereof, it is clear that various modifications and combinations may be made to this application without departing from the spirit and scope of embodiments of this application. Correspondingly, the specification and accompanying drawings are merely example description of this application defined by the accompanying claims, and are considered as any of or all modifications, variations, combinations or equivalents that cover the scope of this application. It is clearly that, a person skilled in the art can make various modifications and variations to this application without departing from the scope of this application. In this way, embodiments of this application are intended to cover these modifications and variations provided that they fall within the scope of protection defined by the following claims of this application and their equivalent technologies.

What is claimed is:

1. A method comprising:
   detecting, by a first device of a system, that a second device approaches the first device;
   sending, by the first device, a first key to a second device of the system, wherein the first key has a valid period, wherein the first key is invalid when the validity period expires, and wherein validity periods of first keys generated by different types of first devices are different;
   after receiving the first key, encrypting, by the second device, a control instruction for controlling the first device by using the first key;
   sending, by the second device, the encrypted control instruction to the first device;
   decrypting, by the first device, the encrypted control instruction to obtain the control instruction; and
   executing the control instruction.

2. The method according to claim 1, wherein the method further comprises:
   displaying, by the second device, first prompt information for notifying whether to apply for a temporary control right over the first device; and
   in response to receiving a confirmation instruction, sending, by the second device, a first application to the first device, wherein the first application indicates that the second device applies for the temporary control right over the first device, and wherein the sending, by the first device, a first key to the second device comprises:
   in response to receiving the first application from the second device, sending, by the first device, the first key to the second device.

3. The method according to claim 2, wherein the system further comprises a fourth device that controls the first device by using a cloud;
   before the sending, by the first device, a first key to the second device, the method further comprises:
   sending, by the first device, a confirmation request for confirming whether the second device is allowed to obtain the temporary control right over the first device to the fourth device, and wherein the sending, by the first device, a first key to the second device comprises:
   sending, by the first device, the first key to the second device when receiving a consent instruction from the fourth device.

4. The method according to claim 3, wherein the sending, by the first device, a confirmation request to the fourth device comprises:
   sending, by the first device, a second application to the cloud, wherein the second application indicates that the second device applies for the temporary control right over the first device;
   determining, by the cloud based on a mapping relationship between a device and an owner in response to the received second application, that the owner of the first device is the fourth device; and
   sending, by the cloud, the confirmation request to the fourth device.

5. The method according to claim 3, wherein the sending, by the first device, the first key to the second device comprises:
   after receiving the consent instruction from the fourth device, in response to detecting that the second device approaches the first device again, sending, by the first device, the first key to the second device.

6. The method according to claim 1, wherein the validity period is: preset, set by a user, or is determined based on a type of the first device.

7. The method according to claim 6, wherein the method further comprises:
   in response to a preset condition is satisfied, the temporary control right of the second device over the first device terminates, wherein
   the preset condition comprises at least one of the following:
   use duration of the first key exceeds the validity period;
   duration starting from a moment at which the second device receives the first key reaches preset duration;
   the first device detects that a third device of the system approaches the first device;
   an operation for terminating the temporary control right of the second device over the first device is detected on the first device;
   the first device receives an instruction from an owner of the first device, wherein the owner is a device that controls the first device by using a cloud, and the instruction instructs to terminate the temporary control right of the second device over the first device; or
   the first device detects that a distance between the second device and the first device is greater than a second preset distance.

8. A communication system, comprising: a first device and a second device, wherein
   the first device comprises one or more processors, a memory storing first instructions for execution by the first device to perform first operations comprising:

detecting that the second device approaches the first device;
sending a first key to the second device;
the second device comprises one or more processors, a memory storing second instructions for execution by the first device to perform second operations comprising:
after receiving the first key, encrypting a control instruction that controls the first device by using the first key, wherein the first key has a valid period, wherein the first key is invalid when the validity period expires, and wherein validity periods of first keys generated by different types of first devices are different;
sending the encrypted control instruction to the first device; and
the first operations further comprising:
decrypting the encrypted control instruction to obtain the control instruction, and executing the control instruction.

9. The communication system according to claim 8, wherein the second operations further comprising:
displaying first prompt information for notifying whether to apply for a temporary control right over the first device; and
in response to receiving a confirmation instruction, sending a first application to the first device, wherein the first application indicates that the second device applies for the temporary control right over the first device, and
the first operations further comprising:
in response to receiving the first application from the second device, sending the first key to the second device.

10. The communication system according to claim 9, wherein the communication system further comprises a fourth device and a cloud, that control the first device by using the cloud; and the first operations further comprising:
sending a confirmation request for confirming whether the second device is allowed to obtain the temporary control right over the first device to the fourth device, and
in response to receiving a consent instruction from the fourth device, sending the first key to the second device.

11. The communication system according to claim 10, wherein the first operations further comprising:
sending a second application to the cloud, wherein the second application indicates that the second device applies for the temporary control right over the first device; and
the cloud comprises one or more processors storing third instructions for execution by the first device to perform third operations comprising:
in response to the received second application, determining, based on a mapping relationship between a device and an owner, that the owner of the first device is the fourth device; and
sending the confirmation request to the fourth device.

12. The communication system according to claim 10, wherein the first operations further comprising: generating authentication-free duration or a quantity of authentication-free times; and
after the temporary control right of the second device over the first device terminates, when the first device detects that the second device approaches the first device again, and determines that the authentication-free duration is not exceeded, or when an accumulated quantity of approaching times of the second device does not exceed the quantity of authentication-free times, skipping confirmation with the fourth device.

13. The communication system according to claim 10, wherein the first operations further comprising: after receiving the consent instruction from the fourth device, and in response to detecting that the second device approaches the first device again, sending the first key to the second device.

14. The communication system according to claim 9, wherein the second operations further comprising:
determining a function in the first device and that supports the temporary control right, wherein the control instruction sent by the second device to the first device is used to control the function in the first device that supports the temporary control right, wherein
the function is a preset function in the first device, a function specified by a user, or a function in the first device unrelated to user privacy.

15. The communication system according to claim 9, wherein the system further comprises a cloud, and the second operations comprising:
displaying second prompt information, wherein the second prompt information is used to prompt whether to apply for a permanent control right over the first device; and
when receiving a confirmation instruction, sending a third application to the first device, wherein the third application indicates that the second device applies for the permanent control right over the first device;
the first operations further comprising: sending the third application to the cloud; and
the cloud comprises one or more processors storing third instructions for execution by the first device to perform third operations comprising:
in response to the received third application, recording that the second device controls the first device by using the cloud.

16. The communication system according to claim 15, wherein the third operations further comprising:
in response to the third application, determining that an owner of the first device is a fourth device;
sending a confirmation request to the fourth device, wherein the confirmation request indicates whether the second device is allowed to obtain the permanent control right over the first device; and
in response to receiving a consent instruction, recording that the owner of the first device is updated from the fourth device to the second device.

17. The communication system according to claim 8, wherein the validity period is: preset, set by a user, or is determined based on a type of the first device.

18. The communication system according to claim 17, wherein the first operations further comprising: in response to a preset condition is satisfied, terminating the temporary control right of the second device over the first device, wherein the preset condition comprises at least one of the following conditions:
use duration of the first key exceeds the validity period;
duration starting from a moment at which the second device receives the first key reaches preset duration;
the first device detects that a third device approaches the first device;
an operation for terminating the temporary control right of the second device over the first device is detected on the first device;
the first device receives an instruction from an owner of the first device, wherein the owner is a device that controls the first device by using a cloud, and the instruction instructs to terminate the temporary control right of the second device over the first device; or the first device detects that a distance between the second device and the first device is greater than a second preset distance.

19. The communication system according to claim 8, wherein the system further comprises the fourth device that controls the first device by using a cloud;

the fourth device comprises one or more processors storing fourth instructions for execution by the first device to perform fourth operations comprising:

receiving a first operation, wherein the first operation indicates to enable a short-range communication function or an ultra-short-range communication function of the first device; and in response to the first operation, sending, to the first device, an instruction that instructs the first device to enable the short-range communication function or the ultra-short-range communication function; and the first operations further comprising: in response to the received instruction, enabling the short-range communication function or the ultra-short-range communication function.

20. The communication system according to claim 8, wherein the first operations further comprising:

detecting that a distance between the second device and the first device is less than a first threshold; or detecting that signal strength of the second device is greater than a second threshold.

* * * * *